United States Patent
Dhandapani

(10) Patent No.: US 12,384,003 B2
(45) Date of Patent: Aug. 12, 2025

(54) METHODS OF MODELING AND CONTROLLING PAD WEAR

(71) Applicant: Applied Materials, Inc., Santa Clara, CA (US)

(72) Inventor: Sivakumar Dhandapani, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 423 days.

(21) Appl. No.: 17/663,952

(22) Filed: May 18, 2022

(65) Prior Publication Data
US 2022/0379431 A1    Dec. 1, 2022

Related U.S. Application Data

(60) Provisional application No. 63/195,450, filed on Jun. 1, 2021.

(51) Int. Cl.
*B24B 49/18*   (2006.01)
*B24B 37/005*   (2012.01)
(Continued)

(52) U.S. Cl.
CPC .......... *B24B 49/186* (2013.01); *B24B 37/005* (2013.01); *B24B 37/042* (2013.01);
(Continued)

(58) Field of Classification Search
CPC ..... B24B 49/186; B24B 49/003; B24B 49/16; B24B 49/00; B24B 49/04; B24B 49/045;
(Continued)

(56) References Cited

U.S. PATENT DOCUMENTS 9,469,013 B2 * 10/2016 Tanikawa .............. B24B 49/006
2005/0208879 A1    9/2005 Paik
(Continued)

FOREIGN PATENT DOCUMENTS

| JP | 2004047876 A | 2/2004 |
|---|---|---|
| JP | 2019013999 A | 1/2019 |
| KR | 20190005119 A | 1/2019 |

OTHER PUBLICATIONS

International Search Report and Written Opinion dated Sep. 14, 2022 for Application No. PCT/US2022/029892.
(Continued)

*Primary Examiner* — David S Posigian
*Assistant Examiner* — Michael A Gump
(74) *Attorney, Agent, or Firm* — Patterson + Sheridan, LLP

(57) ABSTRACT

In one embodiment, a method is provided for polishing a substrate. The method generally includes receiving a plurality of dwell times of a pad conditioning disk, wherein the plurality of dwell times are to be used in a pad conditioning process performed on a pad disposed on a platen, and each dwell time corresponding to a zone of a plurality of zones of the pad disposed on the platen, determining a plurality of total pad conditioning disk cut times to be used in the pad conditioning process, each total pad conditioning disk cut time corresponding to a zone of the plurality of zones, and generating a first pad wear removal model based on a set of parameters, including the plurality of dwell times and the plurality of total pad conditioning disk cut times.

22 Claims, 15 Drawing Sheets

(51) Int. Cl.
  *B24B 37/04*     (2012.01)
  *B24B 49/00*     (2012.01)
  *B24B 49/16*     (2006.01)
  *B24B 53/017*    (2012.01)
  *G05B 23/02*     (2006.01)

(52) U.S. Cl.
  CPC ............ *B24B 49/003* (2013.01); *B24B 49/16* (2013.01); *B24B 53/017* (2013.01); *G05B 23/0254* (2013.01)

(58) Field of Classification Search
  CPC ....... B24B 49/10; B24B 49/105; B24B 49/12; B24B 49/18; B24B 49/0006; B24B 37/042; B24B 37/00; B24B 37/005; B24B 37/013; B24B 37/02; B24B 37/04; B24B 37/07; B24B 37/10; B24B 37/105; B24B 37/107; B24B 37/11; B24B 37/12; B24B 37/20; B24B 37/30; B24B 53/017; B24B 53/00; B24B 53/005; B24B 53/02; B24B 53/12; B24B 7/00; B24B 7/04; B24B 7/228; G05B 23/0254

USPC ................................. 451/56, 72, 443, 21, 5
  See application file for complete search history.

(56) References Cited

U.S. PATENT DOCUMENTS

2005/0282477 A1* 12/2005 Butterfield ............ B24B 53/017
                                                    451/443
  2011/0256812 A1* 10/2011 Dhandapani .......... B24B 53/017
                                                    451/56
  2012/0270477 A1* 10/2012 Nangoy ................ B24B 53/017
                                                    451/443
  2019/0009385 A1*  1/2019 Hiroo .................... B24B 49/105
  2019/0283208 A1*  9/2019 Dhandapani .......... B24B 37/013
  2021/0023672 A1   1/2021 Yamaguchi et al.

OTHER PUBLICATIONS

Notice of Reasons for Rejection issued to Japanese Application No. 2023-572732 on Dec. 24, 2024 in 8 pages.

* cited by examiner

| | D1 | D2 | D3 | D4 | D5 | D6 | D7 | D8 | D9 | D10 | D11 | D12 | D13 |
|---|---|---|---|---|---|---|---|---|---|---|---|---|---|
| Rem_1 | 1 | | | | | | | | | | | | |
| Rem_2 | | 1 | | | | | | | | | | | |
| Rem_3 | | | 1 | | | | | | | | | | |
| Rem_4 | | | | 1 | | | | | | | | | |
| Rem_5 | | | | | 1 | | | | | | | | |
| Rem_6 | | | | | | 1 | | | | | | | |
| Rem_7 | | | | | | | 1 | | | | | | |
| Rem_8 | | | | | | | | 1 | | | | | |
| Rem_9 | | | | | | | | | 1 | | | | |
| Rem_10 | | | | | | | | | | 1 | | | |
| Rem_11 | | | | | | | | | | | 1 | | |
| Rem_12 | | | | | | | | | | | | 1 | |
| Rem_13 | | | | | | | | | | | | | 1 |

| Rem | B | | | D1 | D2 | D3 | D4 | D5 | D6 | D7 | D8 | D9 | D10 | D11 | D12 | D13 |
|---|---|---|---|---|---|---|---|---|---|---|---|---|---|---|---|---|
| Rem_1 | 1 | | | | | | | | | | | | | | | |
| Rem_2 | 1 | | | 1 | | | | | | | | | | | | |
| Rem_3 | 1 | | | 1 | 1 | | | | | | | | | | | |
| Rem_4 | 1 | | | 1 | 1 | 1 | | | | | | | | | | |
| Rem_5 | | | | 1 | 1 | 1 | 1 | | | | | | | | | |
| Rem_6 | | | | | 1 | 1 | 1 | 1 | | | | | | | | |
| Rem_7 | | | | | | 1 | 1 | 1 | 1 | | | | | | | |
| Rem_8 | | | | | | | 1 | 1 | 1 | 1 | | | | | | |
| Rem_9 | | | | | | | | 1 | 1 | 1 | 1 | | | | | |
| Rem_10 | | | | | | | | | 1 | 1 | 1 | 1 | | | | |
| Rem_11 | | | | | | | | | | 1 | 1 | 1 | 1 | | | |
| Rem_12 | | | | | | | | | | | 1 | 1 | 1 | 1 | | |
| Rem_13 | | | | | | | | | | | | 1 | 1 | 1 | 1 | |
| Rem_14 | | | | | | | | | | | | | 1 | 1 | 1 | 1 |
| Rem_15 | | | | | | | | | | | | | | 1 | 1 | 1 |

METHODS OF MODELING AND CONTROLLING PAD WEAR

CROSS-REFERENCE TO RELATED APPLICATION

This application claims the benefit of U.S. Provisional Application No. 63/195,450, filed on Jun. 1, 2021, which is hereby incorporated by reference herein.

BACKGROUND

Field

Embodiments of the invention generally relate to removing material from a substrate. More particularly, embodiments of the invention relate to polishing or planarizing a substrate by chemical mechanical polishing.

Description of the Related Art

In the manufacture of integrated circuits, layers of conductive material are sequentially deposited on a semiconductor wafer and removed to produce a desired circuit on the wafer.

Chemical mechanical polishing (CMP) is commonly used in the manufacturing of high-density integrated circuits to planarize or polish a layer of material deposited on a substrate. In a typical CMP process, a substrate is retained in a carrier head that presses the front side of the substrate against a rotating polishing pad in the presence of a polishing slurry. The carrier head provides a controllable load on the substrate to push the front side of the substrate against the polishing pad. Material is removed across the material layer surface of the substrate in contact with the polishing pad through a combination of chemical and mechanical activity which is provided by the polishing slurry and a relative motion of the substrate and the polishing pad. Typically, the polishing pad is disposed on a disk-shaped polishing platen having a surface which has been formed to have a desired flatness. The polishing pad is secured to the surface of the platen using a pressure sensitive adhesive layer interposed there between. Generally, polishing pads have a limited useful lifetime which thus necessitates that the polishing pad be replaced on a regular basis to prevent degradation of CMP substrate processing results.

After multiple CMP processes are performed over a period of time, the surface of the polishing pad becomes "glazed" due to heat generated by friction between the surface of the substrate and the surface of the polishing pad during polishing which changes the properties of the polishing pad material, and also due to the accumulation of slurry by-products and/or material removed from the substrate. Glazing reduces pad asperities and alters the friction coefficient of the affected region of the polishing pad, and thus reduces the polishing rate across one or more regions of the polishing pad. In addition, glazing may cause the polishing pad to lose some of its capacity to hold the slurry, further reducing the polishing rate.

Typically, the properties of the glazed polishing pad can be restored by a process of conditioning with a pad conditioner. The pad conditioner is used to remove the unwanted accumulations on the polishing pad and regenerate the surface of the polishing pad to a desirable asperity level. Typical pad conditioners include an abrasive head generally embedded with diamond abrasives which can be rubbed against the pad surface of the glazed polishing pad to retexture the pad. The wear of the polishing pad, created by a pad conditioner and polishing of a substrate, may occur in a non-uniform or localized pattern across the pad surface, which may promote uneven planarization of the material that is to be removed from the surface of the substrate.

Despite reconditioning the polishing pad, conventional conditioning process can cause additional problems due to their inability to account for wear of a polishing pad over the polishing pad's life, which can lead to variability in one or more polishing process results and reduce the usable life of the polishing pad. This issue is further magnified due to CMP process variables such as the incoming tolerance of the pad, variation of wear rate from disk to disk, and variations from tool to tool (e.g., conditioning downforce calibration), an often conservative approach in determining pad life is usually followed, and thus the life of the processing pad is not maximized.

Accordingly, there is a need in the art for estimating pad wear to better maximize pad usage, improve polishing process results and maximize the life of the polishing pad.

SUMMARY

In one embodiment, a method is provided for polishing a substrate. The method generally includes receiving a plurality of dwell times of a pad conditioning disk, wherein the plurality of dwell times are to be used in a pad conditioning process performed on a pad disposed on a platen, and each dwell time corresponding to a zone of a plurality of zones of the pad disposed on the platen, determining a plurality of total pad conditioning disk cut times to be used in the pad conditioning process, each total pad conditioning disk cut time corresponding to a zone of the plurality of zones, and generating a pad wear removal model based on a set of parameters, including the plurality of dwell times and the plurality of total pad conditioning disk cut times.

In one embodiment, a non-transitory computer-readable medium is provided for polishing a substrate. The computer-readable medium generally includes code for retrieving a plurality of dwell times of a pad conditioning disk, wherein the plurality of dwell times are to be used in a pad conditioning process performed on a pad disposed on a platen, and each dwell time corresponding to a zone of a plurality of zones of the pad disposed on the platen, determining a plurality of total pad conditioning disk cut times to be used in the pad conditioning process, each total pad conditioning disk cut time corresponding to a zone of the plurality of zones, and generating a pad wear removal model based on a set of parameters, including the plurality of dwell times and the plurality of total pad conditioning disk cut times.

In one embodiment, a method is provided for polishing a substrate. The method generally includes generating a first pad wear model based on a first set of parameters including a plurality of dwell times of a pad conditioning disk used in a pad conditioning process performed on a pad disposed on a platen, updating the first pad wear model based on one or more measurements of the pad, updating the plurality of dwell times based on at least one of a previous pad wear model and on the one or more measurements, and generating a second pad wear model based on the updated first pad wear model with the one or more measurements and a third set of parameters including the updated plurality of dwell times.

In one embodiment, a computer-readable medium storing computer executable code thereon is provided for polishing a substrate. The computer-readable medium generally includes code for retrieving a plurality of dwell times of a pad conditioning disk, wherein the plurality of dwell times are to be used in a pad conditioning process performed on a pad disposed on a platen, and each dwell time corresponding to a zone of a plurality of zones of the pad disposed on the platen. The computer-readable medium generally includes code for determining a plurality of total pad conditioning disk cut times to be used in the pad conditioning process, each total pad conditioning disk cut time corresponding to a zone of the plurality of zones. The computer-readable medium generally includes code for generating a first pad wear removal model based on a set of parameters, including the plurality of dwell times and the plurality of total pad conditioning disk cut times. In another embodiment, the plurality of total cut times is represented by a banded matrix, wherein a width of the band for a zone of the plurality of zones corresponds to the size of the disk.

In one embodiment, a method is provided for conditioning a surface of a polishing pad. The method includes abrading a surface of the polishing pad by translating a pad conditioning disk across the surface of the polishing pad. The polishing pad is divided into a plurality of radial zones that are concentric about a central axis of the polishing pad. A time that the pad conditioning disk dwells over each of the plurality of radial zones during the translation of the pad conditioning disk is determined by combining a cut rate value and desired material removal amount at each of the plurality of radial zones. The time that the pad conditioning disk dwells over at least two of the radial zones of the plurality of radial zones during the process of translating the pad conditioning disk are different. In another embodiment, the pad conditioning disk is configured to simultaneously abrade the surface of the polishing pad within at least two radial zones during the process of translating the pad conditioning disk.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 5 illustrates example matrices used for a pad wear model.

FIG. 8 illustrates example matrices used for an exemplary pad wear model, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the disclosure provided herein include an apparatus and methods of modelling and controlling the wear rate and a resulting surface profile of a polishing pad during one or more chemical mechanical polishing (CMP) processes performed within a polishing station of a CMP system. Embodiments of the disclosure also include one or more computer implemented methods that are configured to utilize CMP system configuration information, measurement data and collected CMP process data to adjust and control one or more process variables utilized in a pad conditioning process and/or polishing process.

Figure 1:
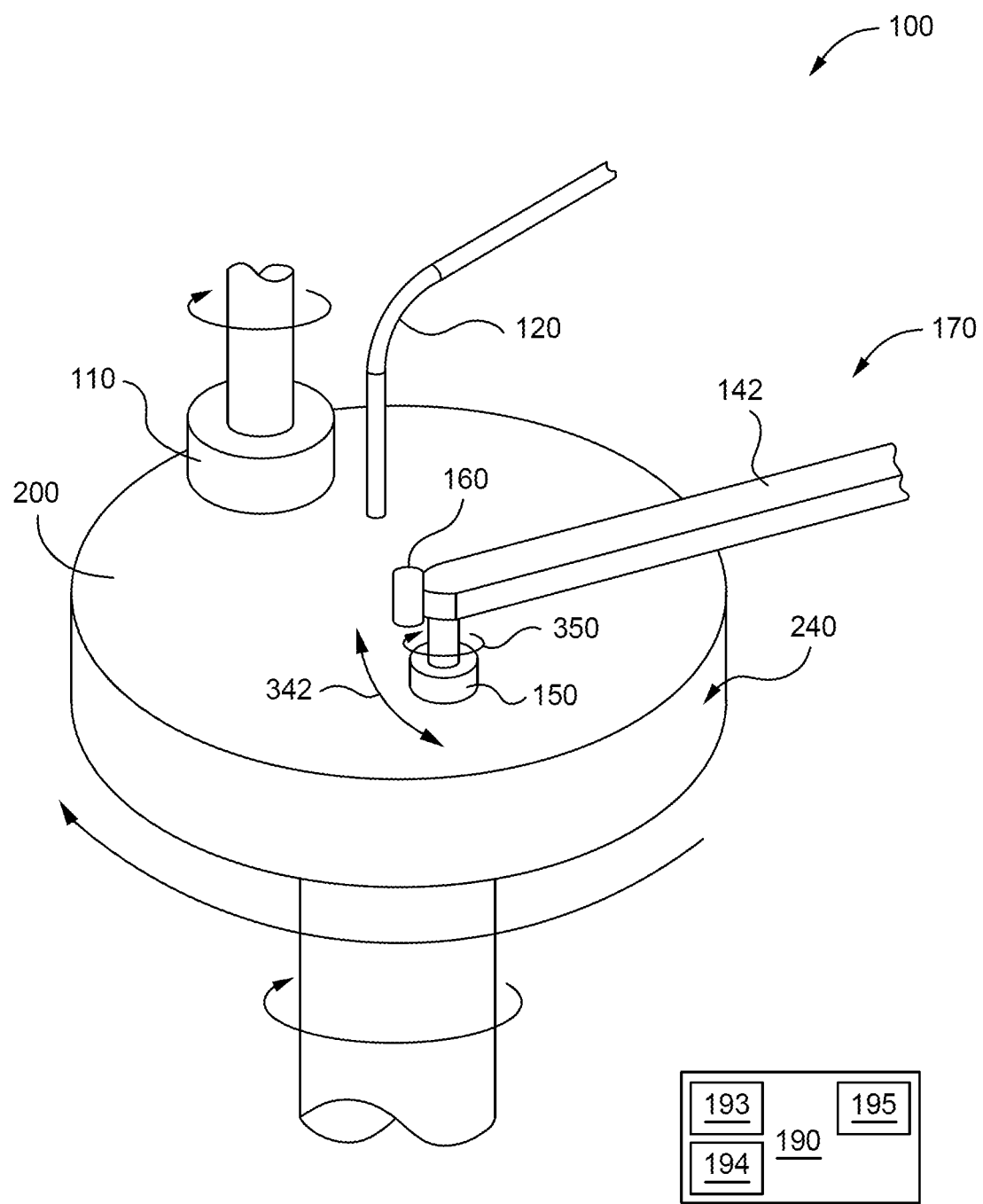
FIG. 1 is a schematic angled view of one embodiment of a chemical mechanical polishing (CMP) station.

FIG. 1 is a schematic top isometric view of a polishing station 100 of a CMP system. For example, the polishing station 100 could be one of two or more polishing stations found in a polishing system available from Applied Materials Inc., such as a Reflexion® LK CMP, Reflexion® LK Prime® CMP or similar apparatus by another manufacturer. The polishing station 100 generally includes a conditioning apparatus 170 and a platen 240 rotated by a motor (not shown). A polishing pad 200 is disposed on the upper surface of the platen 240. A carrier head 110 is disposed above the polishing pad 200 and is adapted to hold and urge a substrate (not illustrated) against the polishing pad 200 during processing. The carrier head 110 may impart a portion of the relative motion provided between the substrate and the polishing pad 200 during processing. In one embodiment, the carrier head 110 may be a TITAN HEAD™ or TITAN PROFILER™ wafer carrier available from Applied Materials, Inc., of Santa Clara, Calif. A processing fluid is provided to the processing surface of the polishing pad 200 by a nozzle 120 coupled to a slurry fluid source (not shown).

Because the polishing rate of the processing pad 200 depends on the condition of the surface of the polishing pad 200, the polishing rate of the processing pad 200 generally decreases during polishing due to glazing of the polishing pad surface, wear and/or accumulation of polishing by-products on the pad surface, resulting in sub optimum polishing qualities. Glazing and wear of the polishing pad may occur in a non-uniform or localized pattern across the pad surface, which may promote uneven planarization of the substrate surface. Thus, the pad surface must periodically be refreshed, or conditioned, to restore the polishing performance of the pad. This is done by the conditioning head 150.

In one embodiment, the conditioning apparatus 170 comprises a displacement sensor 160 coupled to a conditioning head 150 (also referred to herein as a pad conditioning disk) supported by a support assembly (not illustrated) with a conditioning arm 142 therebetween. In one embodiment, the displacement sensor 160 is coupled with the conditioning arm 142. The support assembly is coupled to a base and is adapted, via the conditioning arm 142, to position the pad conditioning disk 150 in contact with the polishing pad 200, and further is adapted to provide a relative motion therebetween. As a result of the relative motion of the pad conditioning disk 150 with respect to the polishing pad 200, the displacement sensor 160 may take thickness measurements of the processing surface 210.

The pad conditioning disk 150 is also configured to provide a controllable pressure or downforce to controllably press the pad conditioning disk toward the polishing pad 200. The downforce pressure can be in a range between about 0.7 psi to about 2 psi. The pad conditioning disk 150 generally rotates and/or moves laterally in a sweeping motion across the surface of the polishing pad 200 as indicated by arrows 350 and 342 in FIG. 1. In one embodiment, the lateral motion of the pad conditioning disk 150 may be linear or along an arc in a range from about the center of the polishing pad 200 to about the outer edge of the polishing pad 200, such that, in combination with the rotation of the platen 240 and polishing pad 200, the entire surface of the polishing pad 200 may be conditioned. The pad conditioning disk 150 may have a further range of motion to move the pad conditioning disk 150 beyond the edge of the polishing pad 200 when not in use.

In one embodiment, the sweeping motion by the pad conditioning disk 150 has a sweep range from a perimeter portion of the pad to the center portion of the pad, i.e., the sweep range is a radial sweep range as the range enables conditioning of a radius of the pad. In other embodiments the sweep range is less than the radial sweep range by some fraction of one. In another embodiment, the sweep range may be greater than the radial sweep range.

As a result of repeated conditioning by the pad conditioning disk 150, eventually the polishing pad 200 needs to be replaced. As discussed above, due to the need to account for various polishing process variables, such as the incoming tolerance of the pad, variation of wear rate from disk to disk, and hardware related variations from tool to tool (e.g., conditioning downforce calibration, polishing pad and/or platen surface waviness), in conventional processes a conservative approach in determining polishing pad lifetime is usually followed, and the life of the processing pad is not maximized. Therefore, one or more of the embodiments of the disclosure provided herein has been developed to better predict and control pad wear and a polishing pad's surface profile, and thus improve CMP polishing results.

As illustrated in FIG. 1, the polishing station 100 further includes a controller 190, which is also referred to herein as a processing chamber controller. The controller 190 can be the CMP polishing system's (not shown) controller that is configured to control one or more aspects of a polishing process sequence, which can include one or more polishing process steps performed in one or more polishing stations and one or more post-polishing cleaning processes, which are all performed within the CMP polishing system. The controller 190 herein includes a central processing unit (CPU) 193, a memory 194, and support circuits 195. The controller 190 is used to control the process sequence used to process a substrate including the substrate polishing process related methods described herein. The CPU 193 is a general-purpose computer processor configured for use in an industrial setting for controlling processing chamber and sub-processors related thereto. The memory 194 described herein, which is generally non-volatile memory, may include random access memory, read only memory, floppy or hard disk drive, or other suitable forms of digital storage, local or remote. The support circuits 195 are conventionally coupled to the CPU 193 and comprise cache, clock circuits, input/output subsystems, power supplies, and the like, and combinations thereof. Software instructions (program) and data can be coded and stored within the memory 194 for instructing a processor within the CPU 193. A software program (or computer instructions) readable by CPU 193 in the controller 190 determines which tasks are performable by the components in the polishing station 100. Preferably, the program, which is readable by CPU 193 in the controller 190, includes code, which when executed by the processor (CPU 193), perform tasks relating to the monitoring and execution of the pad conditioning and polishing processes described herein. The program will include instructions that are used to control the various hardware and electrical components within the polishing station 100 to perform the various process tasks and various process sequences used to implement one or more of the methods described herein.

Polishing Pad Profile and Wear Measurement Techniques

Figure 2:
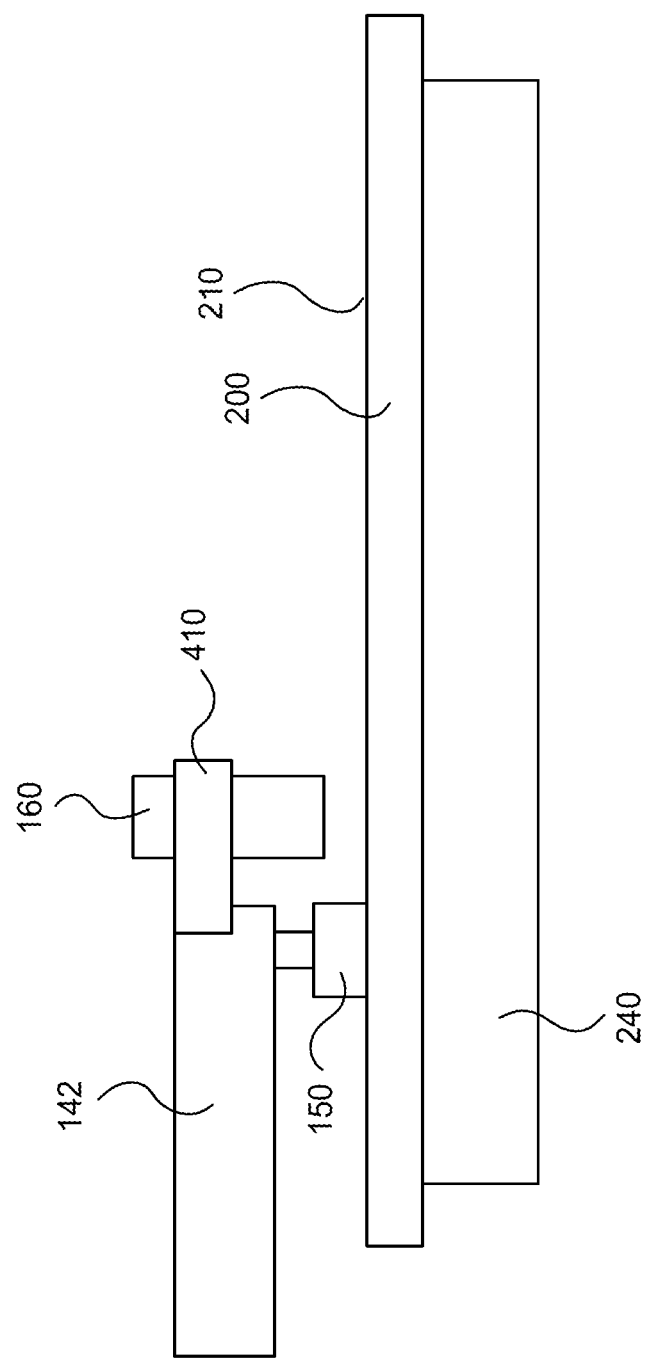
FIG. 2 is a schematic side view of a CMP station with a displacement sensor mounted to a conditioning arm.

FIG. 2 illustrates embodiments of the invention in which a displacement sensor 160 is coupled to the conditioning arm 142 by means of a mounting apparatus 410. As mentioned, because of repeated conditioning by the pad conditioning disk 150, eventually the processing pad 200 needs to be replaced. However, due to the incoming tolerance of the pad, variation of wear rate from disk to disk, and variations from tool to tool (e.g., conditioning downforce calibration). The sensor coupled to the conditioning arm allows a thickness of the processing pad 200 to be measured at various points during a portion of a normal operation cycle, while the accompanying logic allows the measurement data to be captured and displayed (e.g., generation of a two-dimensional map of the processing pad). In some embodiments, the sensor 160 may utilize a laser to measure the thickness of the pad. In other embodiments, the sensor 160 may be an inductive sensor. By coupling the sensor to the conditioning arm, which moves up and down vertically as the pad thickness varies across different portions of the pad, the sensor can detect the relative thickness of the pad at various points across the pad and thus determine variations in the pad surface profile and pad wear.

Figure 3:
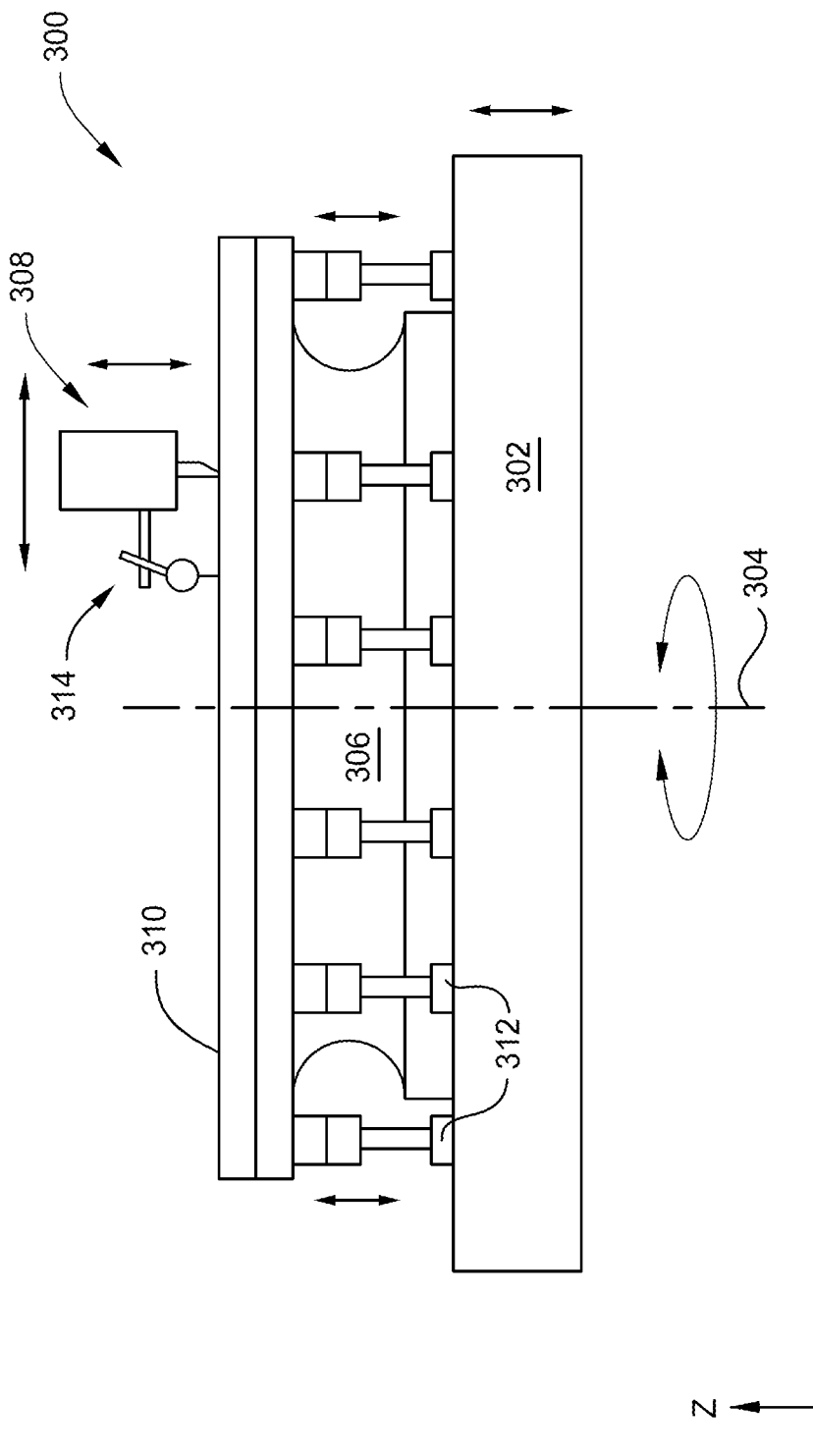
FIG. 3 is a schematic side view of a measurement system used in conjunction with a CMP station, according to one embodiment.

FIG. 3 illustrates a measurement system 300, which may be used to measure the surface profile of a polishing pad 200 disposed on the surface of a platen 240 at various times during a polishing pad's life to determine polishing pad wear. In this example, the measurement system 300 is a vertical turning lathe which features a support spindle 302 which is rotatable about a spindle axis 304, a mounting fixture 306 secured to the support spindle 302, and a surface profiler 314, such as a dial gauge, coupled to a profile measurement tool 308 which may be used to measure the flatness of the polishing platen 310 before, during, and after surface profile modification thereof. The surface profile 314 may be disposed above the support spindle 302 and facing there towards. The polishing platen 310 is secured to the mounting fixture 306 using a plurality of fasteners 312 which are adjustable in the Z-direction to pull or push the outer radius of the mounting fixture 306, and thus the polishing platen 310, towards or away from the support spindle 302. Generally, the surface profiler 314 measures the distance from a reference plane that is parallel to the pad mounting surface. While the surface profiler 314 provides the most accurate measurement of pad wear, the surface profile 314 may use a large amount of time to generate these accurate measurements of the pad wear.

There are trade-offs between using the surface profiler 314 of FIG. 3 and using the displacement sensor 160 of FIG. 2 to generate measurements of pad wear. While the amount of time to generate measurements of pad wear is greater for the surface profiler 314 than the amount of time to generate measurements using the displacement sensor 160, the surface profile 314 generates more accurate measurements than the measurements generated by the displacement sensor 160. Furthermore, the measurements by the displacement sensor 160 may be space-averaged measurements because the displacement sensor 160 is attached to the pad conditioning disk 150 and the pad conditioning disk 150 may not completely flush against the surface of the pad 200. Accordingly, the displacement sensor 160 may be insufficient for estimating a center-to-edge profile for extreme pad wear profiled with sharp gradients.

Pad Conditioning and Polishing Process Improvement Techniques

Figure 4:
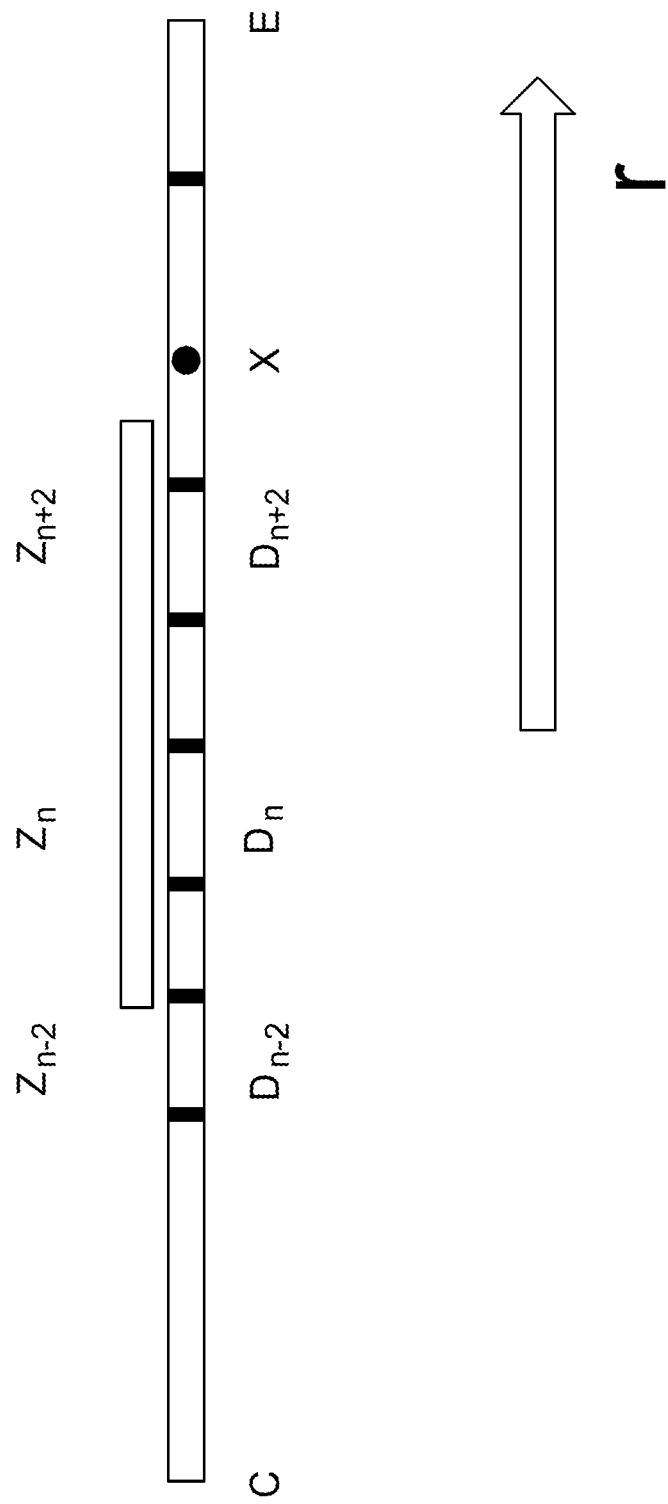
FIG. 4 illustrates an example pad conditioning disk disposed on a part of a wafer, according to one embodiment.

FIG. 4 illustrates a conditioning pad disposed over a portion of a polishing pad, according to embodiments. In one embodiment, the pad 200 has a radius extending from C to E, where C is the center of the pad and E is the circumferential edge of the pad 200. As mentioned previously, the pad conditioning disk 150 can be positioned on the polishing pad 200 anywhere between C and E, and in some cases portions of the conditioning disk 150 can extend past the points C and/or E. As illustrated in FIG. 4, the pad 200 may be divided up into multiple pad conditioning zones ($Z_n$). During a pad conditioning process, in which the pad conditioning disk 150 is translated across the surface of the polishing pad 200, each pad conditioning zone will have a corresponding dwell time, or the amount of time that a portion of the pad conditioning disk 150 is in contact with a portion of the pad conditioning zone.

In some embodiments, multiple factors may influence pad wear or pad removal when the pad conditioning disk 150 contacts the polishing pad 200. These factors can include, but are not limited to, pad conditioning disk downforce, dwell times, linear platen velocity, and annular area of the polishing pad between two different radiuses. As mentioned previously, downforce is the amount of pressure used to controllably press or urge the pad conditioning disk 150 against the polishing surface of the pad 200. Dwell time is the residence time of the pad conditioning disk 150 within each radial conditioning zone, and can be adjusted to yield a desired sweep schedule. The annular area factor is the annular area of the polishing pad disposed between two different radiuses (e.g., one radius is at 1 inch and the other radius is at 2 inches). In some embodiments, for the annular area, as annular area increases, the cut rate decreases linearly with the change in radius, as provided in the following equation: $A=(2\pi r)\times\Delta r$.

Figure 5:
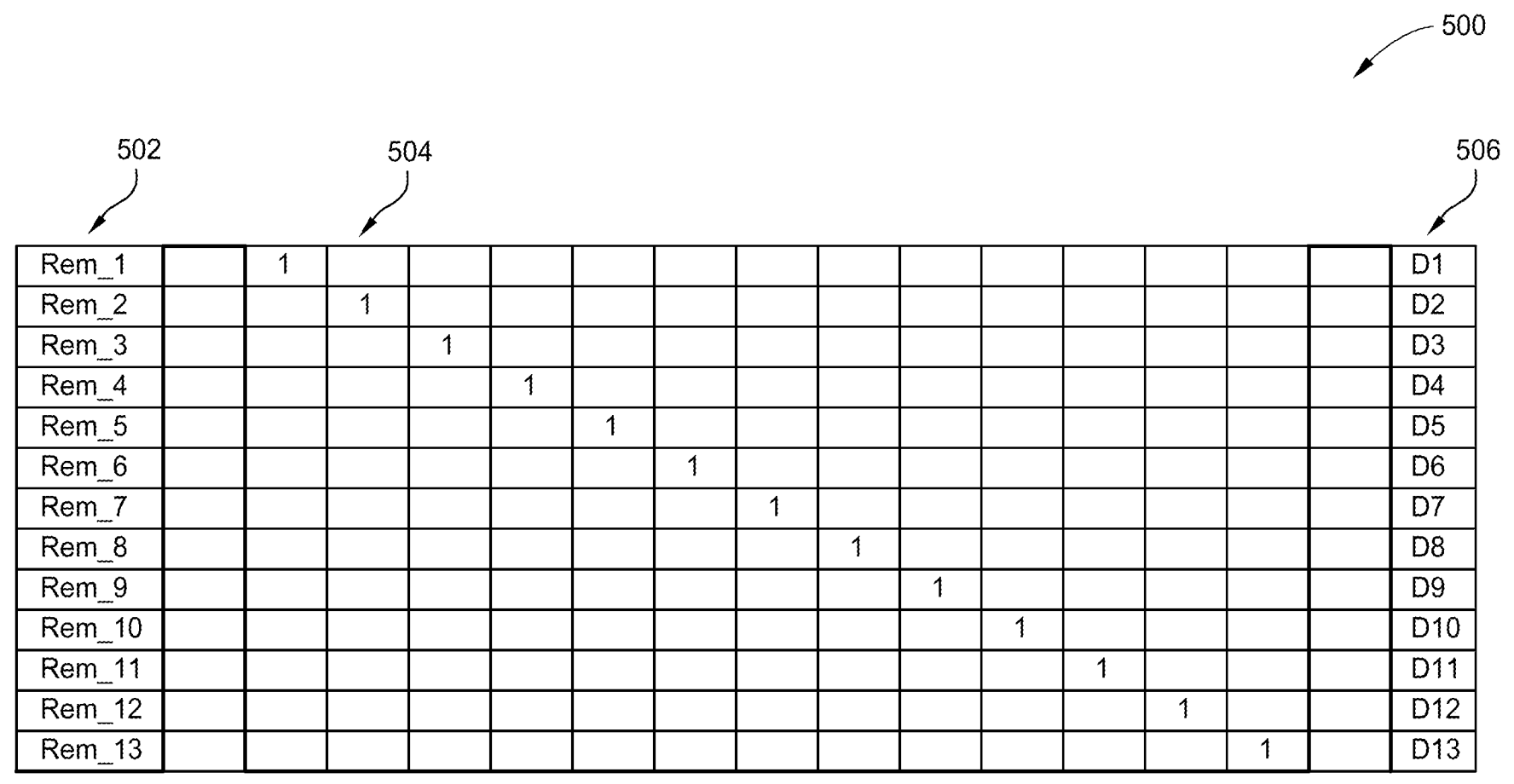

FIG. 5 illustrates matrices used in a simplified or basic pad wear model, according to one embodiment. Specifically, the pad wear model 500 is generated by the combination of matrices of parameters that influence pad wear: a total cut time matrix 504 for each radial conditioning zone of the pad 200, and a dwell time matrix 506 having dwell times for each radial conditioning zone of the pad 200. The pad wear model 500 may be represented by a resulting matrix 502 having estimated pad wear amounts for each radial conditioning zone of the pad 200. The basic pad wear model 500 can be generated with the matrices 502, 504 and 506 of FIG. 5 using the following equation:

$$[Rem]=CR*PC_{time}*B*u$$

where [Rem] is the resulting matrix 502 measured in meters, CR is a matrix having the cut rate (i.e., the pad material removal rate created by the pad conditioning disk as it cuts into the polishing pad 200) for radial conditioning zone of the pad 200 measured in meters/second, $PC_{time}$ is total pad conditioning time of the pad 200 measured in seconds, B is the total cut matrix 504, and u is a dwell time matrix 506 measured as a percentage of the $PC_{time}$. For example, a pad conditioning process includes a pad conditioning disk that has a cut rate of 1 μm/s, a total pad conditioning time of 10 seconds, a radial conditioning zone Zn, and a dwell time of 1 sec in the radial conditioning zone Zn during the pad conditioning process will lead to a result where 10 μm of pad material is removed from zone Zn. In some embodiments, the resulting matrix 502 is a vector including an estimated pad wear amount for each radial conditioning zone of the pad 200. In some embodiments, the total cut time matrix 504 is a matrix representing whether the conditioning disk 150 is disposed over a particular radial conditioning zone, and indicates the dominant dwell time via a non-zero element when the total cut time matrix 504 is multiplied by the dwell time matrix 506. The total cut time matrix 504 has a number of columns and a number of rows equaling the number of radial conditioning zones of the pad 200, and the total cut time cut matrix 504 includes non-zero elements disposed on the main diagonal of the matrix and zeros elsewhere, where the non-zero elements represent the conditioning disk 150 being disposed over a particular radial conditioning zone. In some embodiments, the dwell time matrix 506 is a vector including a dwell time of the pad conditioning disk 150 for each radial conditioning zone of the pad 200.

While the pad wear model of FIG. 5 does provide an estimation of the amount of pad wear based on parameters influencing pad wear, the pad wear model 500 is based on assumptions that affect the accuracy of the model 500. First, the basic pad wear model 500 assumes that only the dwell time of the pad conditioning disk 150 when contacting a radial conditioning zone of the pad 200 influences the depth of pad wear in the respective radial conditioning zone. Accordingly, the basic pad wear model 500 assumes that the amount of pad wear for a particular radial conditioning zone is a function of the dwell time of that particular radial conditioning zone. This assumption does not take into account that because of the size of the pad conditioning disk 150, the pad conditioning disk 150 may extend into neighboring radial conditioning zones. Second, the basic pad wear model 500 assumes the model is used for closed loop control, which is forgiving to model uncertainty, and thus the model captures the effects of the parameters affecting pad wear. As a corollary, the pad wear model assumes the pad wear model has measurement feedback of the pad thickness, and thus can be updated based on the measurement feedback. Third, the pad wear model 500 assumes flat pad removal on a flat platen, and thus does not take into account that polishing pads may not be flat and that platens may not be flat. Accordingly, the pad wear model 500 needs to address these assumptions in order to generate a more accurate pad wear model result.

According to another embodiment, the pad wear model can be modified to account for the pad conditioning disk 150 being disposed over multiple radial conditioning zones at one time as it is translated across the surface of the polishing pad during a pad conditioning process. FIGS. 6A-E illustrate example cut times for a point X on the pad and the pad conditioning disk 150 disposed over the pad 200 at different positions. As mentioned, the pad conditioning disk 150 may be cutting into multiple radial conditioning zones at the same time, based on the size of the pad conditioning disk 150 and the defined size of the radial conditioning zones. As illustrated, the pad conditioning disk 150 in FIG. 6A-E has a radius R and can be disposed over any radial conditioning zone of the pad 200. For illustrative purposes, the conditioning disk 150 can contact portions of at least three zones and is configured to condition five different radial conditioning zones as the pad conditioning disk 150 moves from the center of the pad 200 to the edge of the pad 200. X can be any point of any radial conditioning zone on the pad 200.

Figure 6A:
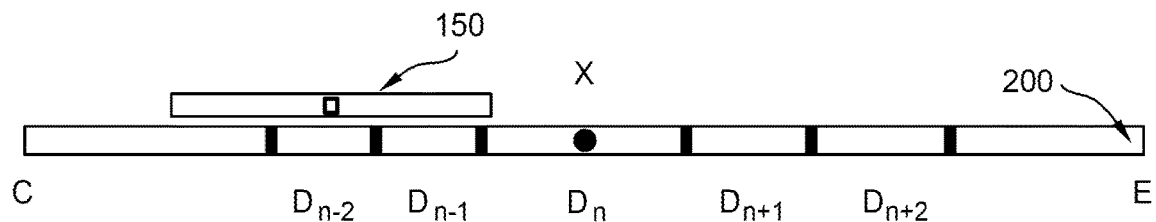
FIG. 6A-E illustrate example positions of the pad conditioning disk moving from the center of the wafer to the edge of the wafer, according to one embodiment.

As illustrated in FIG. 6A, the center of the pad conditioning disk 150 is disposed over radial conditioning zone $Z_{n-2}$ of the pad 200. Because the radius of the pad conditioning disk 150 is larger than the radial conditioning zone $Z_{n-2}$ (i.e., the pad conditioning disk 150 extends beyond the boundaries of a radial conditioning zone), part of the pad conditioning disk 150 is also disposed over radial conditioning zone $Z_{n-1}$. However, because the pad conditioning disk 150 is not disposed over the radial conditioning zone in which point X is disposed, there is no cut time at point X.

Figure 6B:
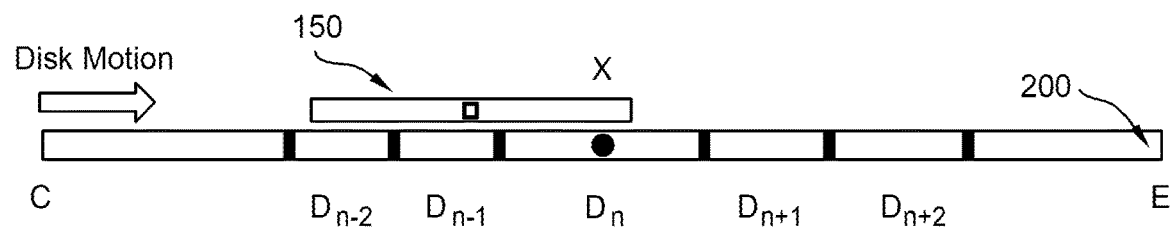

As illustrated in FIG. 6B, the center of the pad conditioning disk 150 is disposed over radial conditioning zone $Z_{n-1}$ of the pad 200. Because the pad conditioning disk 150 is larger than the radial conditioning zone $Z_{n-2}$, part of the pad conditioning disk 150 is also disposed over radial conditioning zone $Z_n$ and radial conditioning zone $Z_{n-2}$. Accordingly, as the pad conditioning disk 150 moves from the center to the edge of the pad 200, when the pad conditioning disk 150 is disposed over radial conditioning zone $Z_{n-1}$, the total cut time at point X is $D_{n-1}$, which is the dwell time of the pad conditioning disk 150 over radial conditioning zone $Z_{n-1}$ during which the pad conditioning disk 150 is cutting into the pad 200.

Figure 6C:
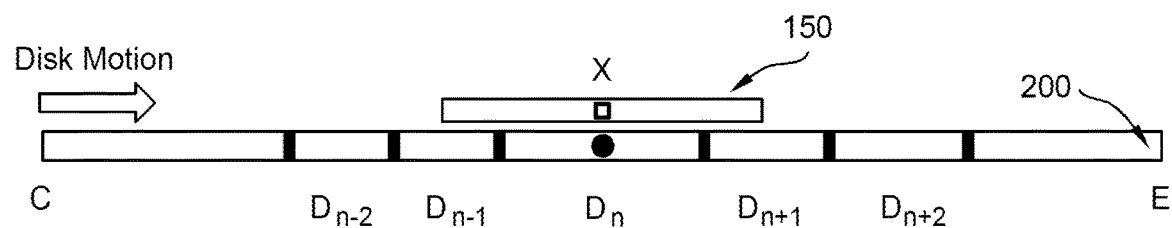

FIG. 6C illustrates the center of the pad conditioning disk 150 disposed over radial conditioning zone $Z_n$ of the pad 200. The dwell time of the pad conditioning disk 150 over radial conditioning zone $Z_n$ is $D_n$, and the total cut time at point X is $D_{n-1}+D_n$ as the pad conditioning disk 150 has moved from $D_{n-1}$ to $D_n$. Accordingly, the total cut time is a summation of the dwell times as the pad conditioning disk 150 moves across each of the radial conditioning zones.

Figure 6D:
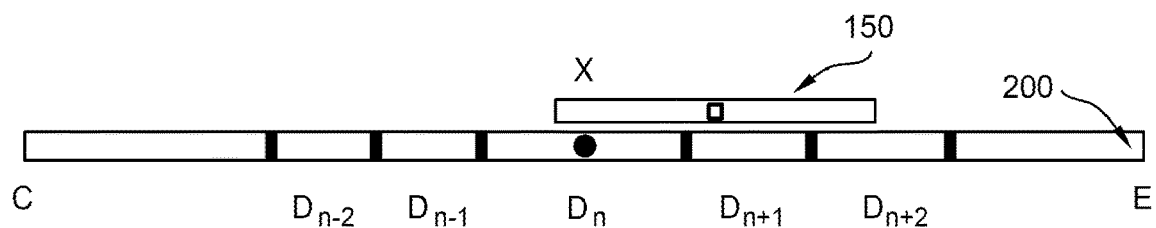

FIG. 6D illustrates the center of the pad conditioning disk 150 disposed over radial conditioning zone $Z_{n+1}$ of the pad 200. As mentioned previously, because the pad conditioning disk 150 is larger than the radial conditioning zone $Z_n$, part of the pad conditioning disk 150 is also disposed over radial conditioning zone $Z_n$ and radial conditioning zone $Z_{n+2}$. Accordingly, as the pad conditioning disk 150 moves from the center to the edge of the pad, when the pad conditioning disk 150 is disposed over radial conditioning zone $Z_{n+1}$, the total cut time at point X is $D_{n-1}+D_n+D_{n+1}$.

Figure 6E:
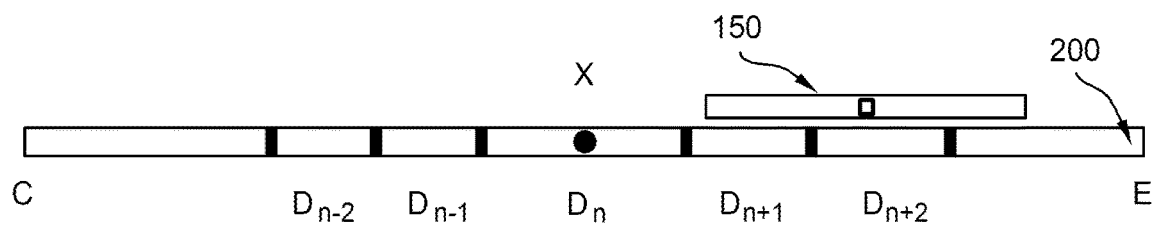

FIG. 6E illustrates the center of the pad conditioning disk 150 disposed over radial conditioning zone $Z_{n+2}$ of the pad 200. As mentioned previous, because the pad conditioning disk 150 is larger than the radial conditioning zone $Z_{n+1}$, part of the pad conditioning disk 150 is also disposed over radial conditioning zone $Z_{n+1}$. However, no part of the pad conditioning disk 150 is disposed over point X, and thus there is no cut at point X.

As illustrated with FIG. 6A-E, the total cut time at any point on the pad 200 is determined at least partially by the size of the pad conditioning disk 150 and the defined size of the radial conditioning zones.

Figure 7:
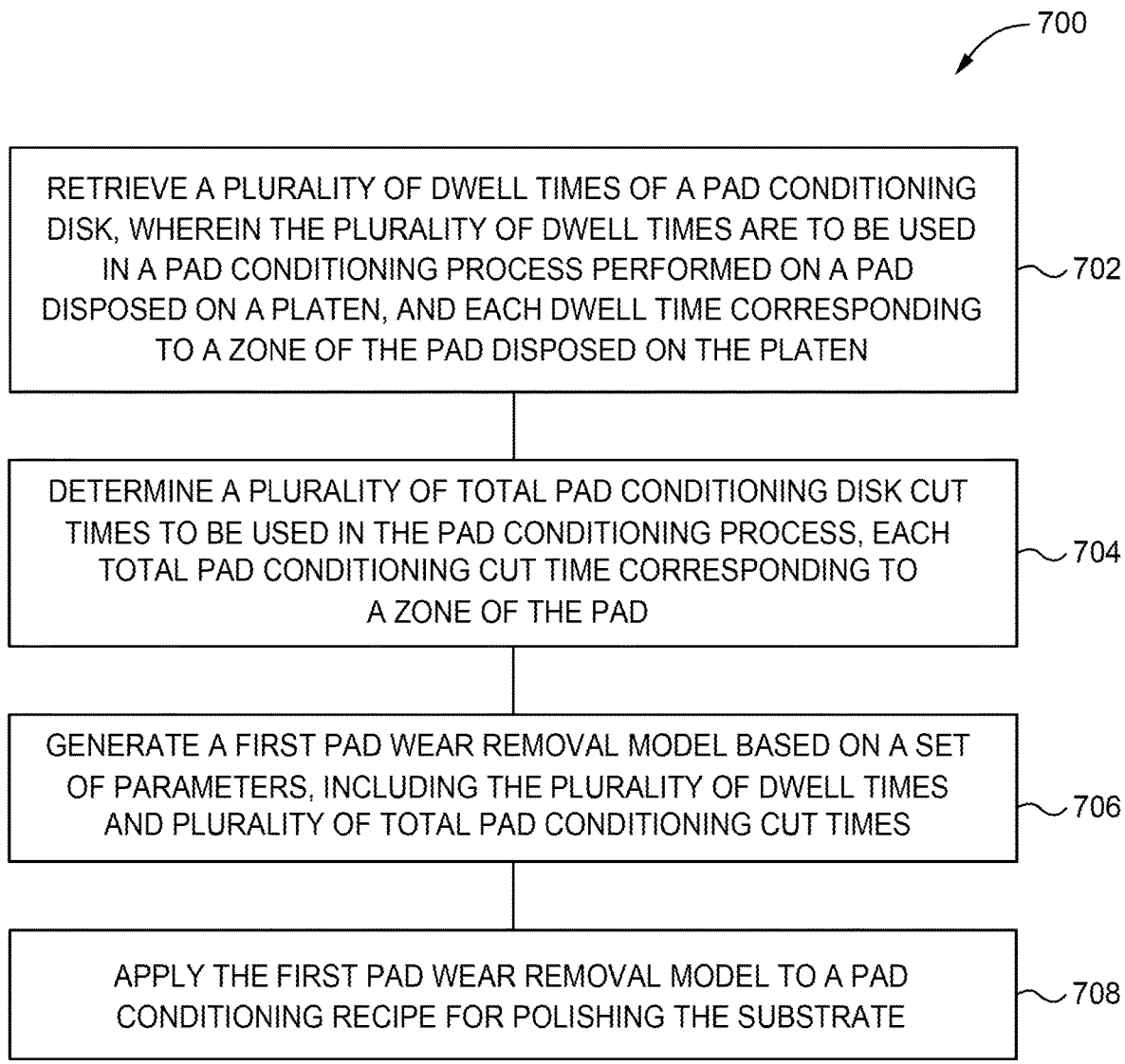
FIG. 7 is a flow diagram illustrating example operations for polishing a substrate, according to one embodiment.

FIG. 7 is a flow diagram of example operations for polishing a substrate, according to one embodiment. Specifically, operations 700 may be implemented as software components that are executed and run on one or more processors found within the controller 190. In the embodiment for polishing a substrate, operations 700 involve a pad wear model that can be used for determining when to replace a pad (e.g., pad 200 of FIG. 1) disposed on a platen (e.g., platen 240 of FIG. 1).

The operations 700 may begin at block 702 by retrieving a plurality of dwell times, each dwell time corresponding to a zone of a pad disposed on a platen. The plurality of dwell times may be represented by a matrix or a vector. In some embodiments, the retrieved dwell times were created from prior pad conditioning processes run on the same type of polishing pad that is positioned on a platen 240 that is representative of most platens 240 in most polishing stations.

At block 704, operations 700 continue with determining a plurality of total cut times, each total cut time corresponding to a zone of the polishing pad. Like the plurality of dwell times, the plurality of total cut times may be represented by a matrix having zero elements and non-zero elements, and each row of the matrix has a band of non-zero elements. As mentioned, the non-zero elements of each row of the matrix indicates the dominant dwell time for the radial conditioning zone corresponding to the respective row of the matrix. Using the example in FIG. 6A-E, the total cut time at point X in radial conditioning zone $Z_n$ is $D_{n-1}+D_n+D_{n+1}$, so the row corresponding to $Z_n$ includes non-zero elements located in positions corresponding to $Z_{n-1}$, $Z_n$, and $Z_{n+1}$, which are the radial conditioning zones over which the pad conditioning disk disposed as the pad conditioning disk moves from the center of the pad to the edge of the pad.

At block 706, operations 700 continue with generating a first pad wear removal model based on a set of parameters, the set of parameters include the plurality of dwell times and the plurality of total cut times. The first pad wear removal includes pad wear for each radial conditioning zone, and thus provides an accurate characterization of pad wear of the pad.

At block 708, operations 700 continue with applying the first pad wear removal model to a pad conditioning recipe for polishing the substrate. In one embodiment, the pad wear removal model is used, or implemented, by one or more software algorithms running within the controller 190 to adjust the cut times, within each of the modelled zones, of the pad conditioning recipe to achieve a desired polishing pad surface profile.

As mentioned above, the pad wear model can be modified such that the model accounts for parameters that affect the resolution of the pad wear model profile, such as the size of the pad conditioning disk and the defined size of the radial conditioning zones. FIG. 8 illustrates matrices of an exemplary pad wear removal model, according to some embodiments. In one embodiment, the pad wear removal model is generated using the following equation:

$$[Rem]=CR*PC_{time}*B*u$$

where [Rem] is the resulting matrix 802 measured in meters, CR is a matrix having the cut rate for each radial conditioning zone of the pad 200 measured in meters/second, $PC_{time}$ is a matrix having the pad conditioning times for each radial conditioning zone of the pad 200 measured in seconds, B is the total cut matrix 804, and u is a dwell time matrix 806 measured as a percentage of $PC_{time}$. The equation used for the pad wear removal model in FIG. 5 may be the same equation used for the pad wear removal model in FIG. 8. In some embodiments, the resulting matrix 802 is a vector including an estimated pad wear amount for each radial conditioning zone of the pad 200. In some embodiments, the dwell time matrix 804 is a vector including a dwell time of the pad conditioning disk 150 for each radial conditioning zone of the pad 200.

In one embodiment, instead of total cut time matrix 504 of FIG. 5, the total cut time matrix 804 is a banded matrix as illustrated in FIG. 8, and the width of the band in the horizontal direction for a particular row of the total cut time matrix 804 spans the size of the pad conditioning disk 150. For example, each non-zero element of the total cut time matrix 804 indicates that the pad conditioning disk 150 is disposed over a radial conditioning zone based on the size of the pad conditioning disk 150. In some embodiments, each non-zero element of the total cut time matrix 804 indicates whether a corresponding dwell time is to be used in a total cut time for a radial conditioning zone. For example, using the example of the pad conditioning disk motion over the pad 200 in FIGS. 6A-E, because the total cut time at point X was $D_{n-1}+D_n+D_{n+1}$, the row of the total cut time matrix 804 corresponding to the radial conditioning zone in which point X is disposed includes a non-zero elements located in columns corresponding to $Z_{n-1}$, $Z_n$ and $Z_{n+1}$ of the total cut time matrix 804.

Figure 9A:
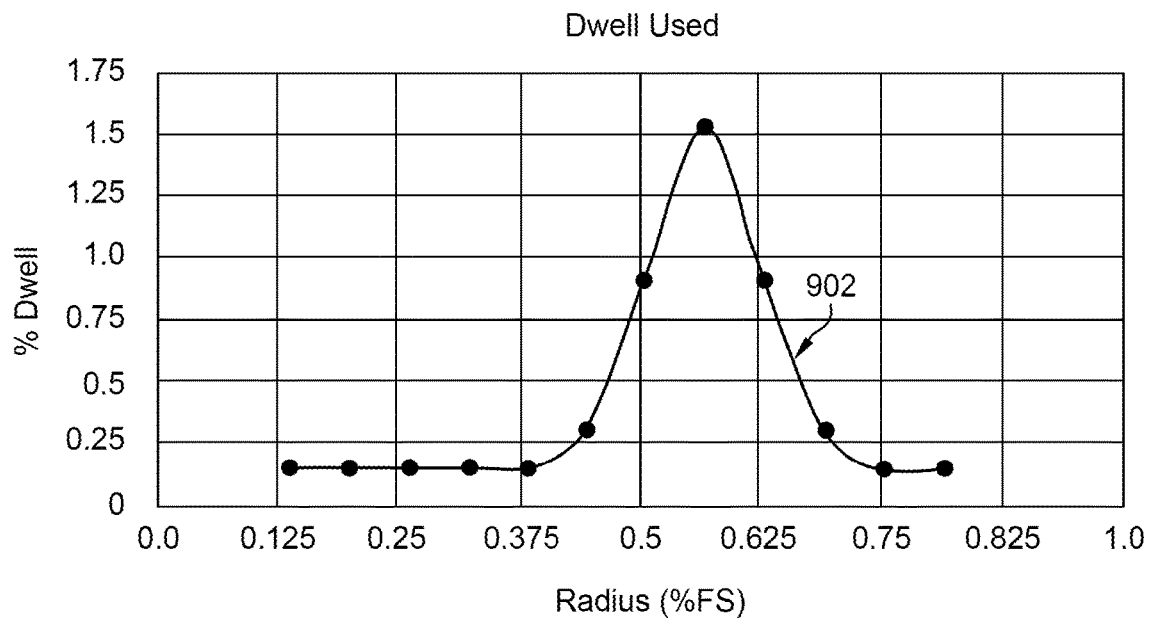
FIG. 9A illustrates a dwell profile, according to one embodiment.
Figure 9B:
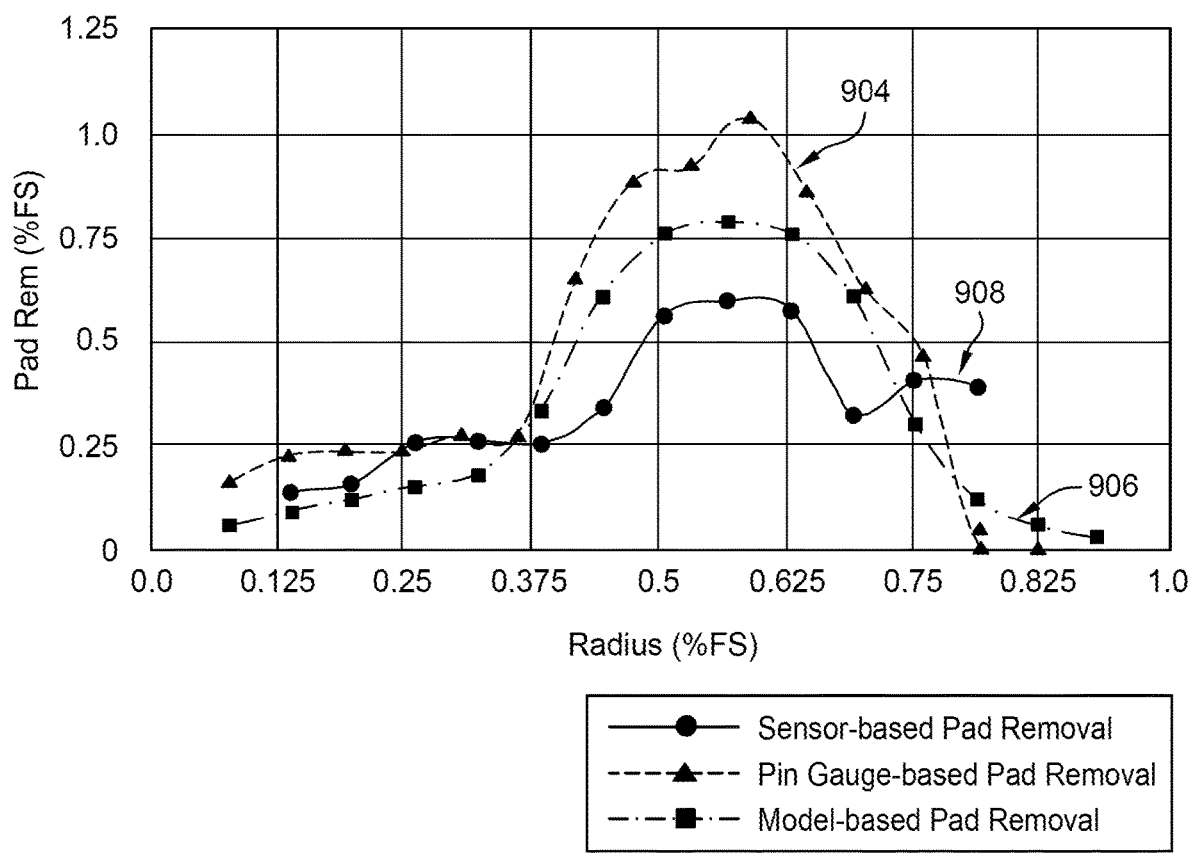
FIG. 9B illustrates pad wear removal profiles based on the dwell profile of FIG. 9A, according to one embodiment.

Using the pad wear model 800 of FIG. 8, the pad wear may be defined at any point on the pad and thus forms a high resolution model. The pad wear model 800 has advantages over the basic pad wear model (i.e., the pad wear model 500). For example, the pad wear model 800 considers the case where the pad conditioning disk is larger in size than the extents of the radial zones, such that the pad conditioning disk cuts into multiple radial conditioning zones at the same time. Beneficially, this allows the polishing pad surface to be broken up into many zones, which have extents that are smaller than the size of the conditioning disk, so that a desired high resolution pad conditioning profile can be created during processing. In another example, because the pad wear model 800 does consider cutting multiple radial conditioning zones at the same time, the pad wear model 800 has a higher accuracy in terms of estimating pad wear profiles with sharp gradients between radial conditioning zones. FIGS. 9A-B illustrate the accuracy of a pad wear profile based on the pad wear model 800 in comparison to pad wear profile based on other methods of determining pad wear, such as pin gauge measurements and sensor measurements.

In some embodiments, the pad wear model may be used to predict dwell times for pad recess shaping. In such embodiments, predicting dwell times for pad recess shaping involves using the equation used for generating the pad wear model:

$$[Rem]=CR*PC_{time}*B*u$$

where [Rem] is the resulting matrix 802 measured in meters, CR is a matrix having the cut rate for each radial conditioning zone of the pad measured in meters/second, $PC_{time}$ is a matrix having the pad conditioning times for each radial conditioning zone of the pad measured in seconds, B is the total cut matrix 804, and u is a dwell time matrix 806 measured as a percentage of $PC_{time}$. In some embodiments, $$CR = \begin{bmatrix} CR_1 & \cdots & 0 \\ \vdots & \ddots & \vdots \\ 0 & \cdots & CR_n \end{bmatrix}$$

where n is the number of radial conditioning zones of the pad 200. Predicting dwell times for pad recess shaping may involve the following equation:

$$u=(CR*PC_{time})^{-1}*[B^T*B+\delta*D^T*D]^{-1}B^T*[Rem]$$

where [Rem] is the resulting matrix 802 measured in meters, CR is a matrix having the cut rate for each radial conditioning zone of the pad measured in meters/second, $PC_{time}$ is a matrix having the pad conditioning times for each radial conditioning zone of the pad measured in seconds, B is the total cut matrix 804, u is a dwell time matrix 806 measured as a percentage of $PC_{time}$, $B^T$ is the traverse matrix of B, D is the second-order difference matrix, and $D^T$ is the transverse matrix of D. In some embodiments, CR is the cut rate dependent on the consumable type and pad conditioning disk downforce. The predicted dwell profiles can be used to generate specific profiles for recesses on the polishing pad at a particular location.

FIG. 9A illustrates an example dwell profile generated based on a sensor (e.g., displacement sensor 160 of FIG. 2), while FIG. 9B illustrates example pad removal profiles generated based on the pad wear removal model 800, a pin gauge measurement (using a surface profiler 314 of FIG. 3), and a sensor (e.g., the displacement sensor 160 of FIG. 2). Specifically, the pad removal profiles 904, 906, and 908 plotted on the graph of FIG. 9B are based on a 40 min ex-situ conditioning recipe (e.g., parameters) for a pad conditioning process using the example dwell profile 902 of FIG. 9A. The pad removal profile 904 generated based on pin gauge measurements may be considered the closest estimation of pad wear because the pin gauge measurements involve the surface profiler 314 of FIG. 3 directly contacting the pad and measuring the profile, or topography, of the surface of the pad. As illustrated, the pad removal profile 906 generated based on the pad wear model tracks more closely to the pad removal profile 904 generated based on the pin gauge measurements than the pad removal profile 908 generated based on the sensor, especially in radial areas with higher pad removal. These areas of higher pad removal also correspond to the percentage of dwell time illustrated in FIG. 9A.

In some embodiments, the smoothness of the predicted dwell profile depends on the noise level of the removal profile. If the removal profile is noisy, the calculated dwell profile may be smoothed out by regularization using the following equation:

$$u=(CR*PC_{time})^{-1}*[B^T*B+\delta*D^T*D]^{-1}B^T*[Rem].$$

In such embodiments, CR is the cut rate (measured in meters/second) dependent on the type of pad and pad conditioning disk, and CR is dependent on pad conditioning disk downforce.

Figure 10A:
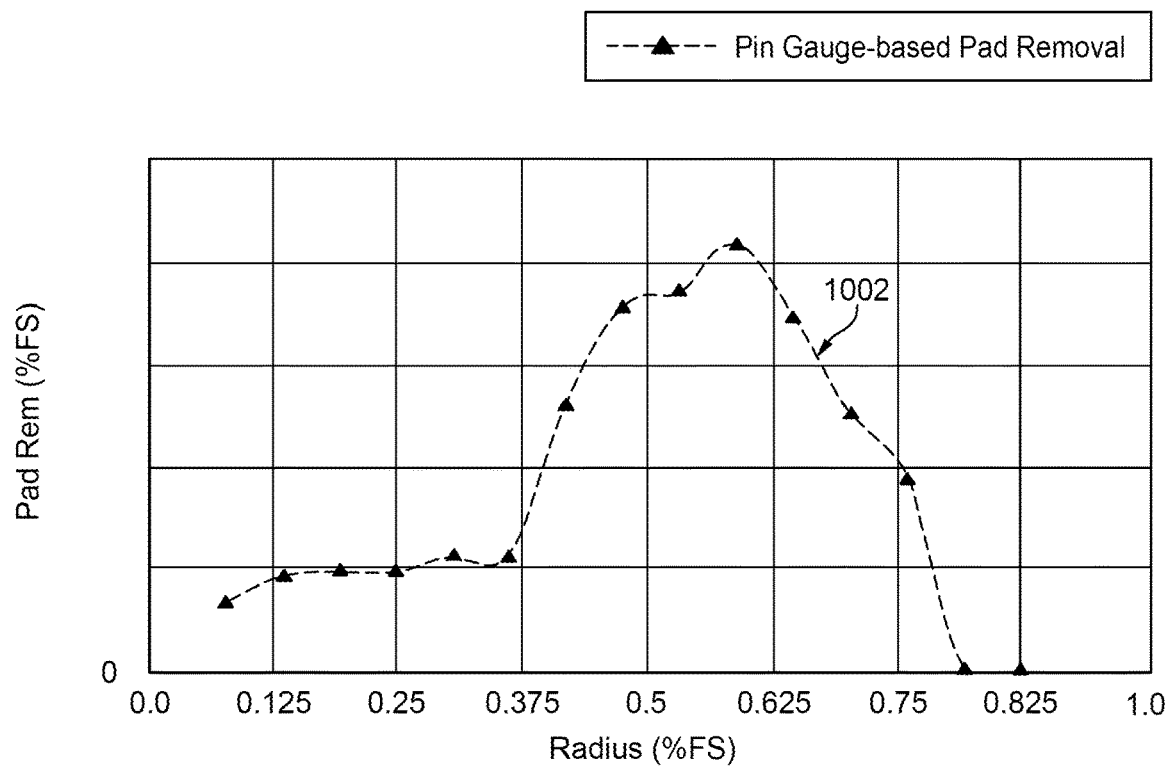
FIG. 10A illustrates a pad wear removal profile, according to one embodiment.
Figure 10B:
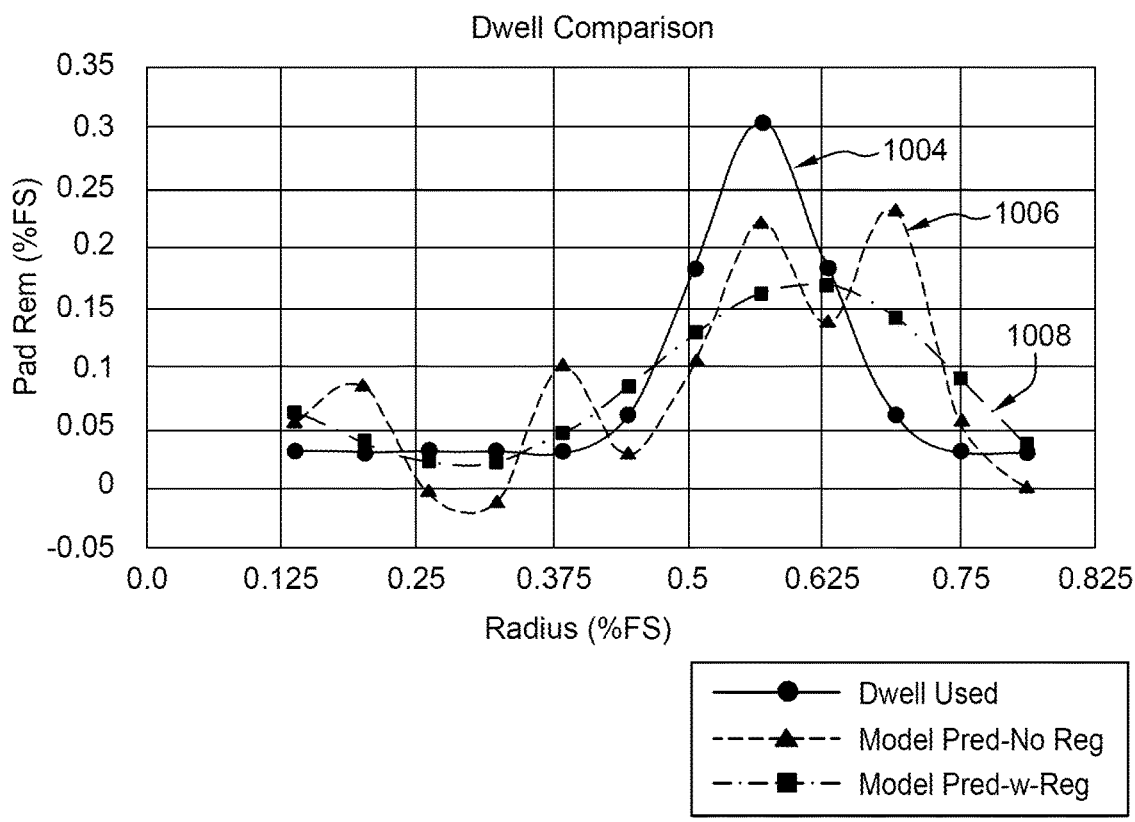
FIG. 10B illustrates exemplary predicted dwell profiles based on the pad wear removal profile of FIG. 10A, according to one embodiment.

FIG. 10A illustrates a pad removal profile generated using measurements from pin gauge measurements (e.g., a surface profiler 314 of FIG. 3), and FIG. 10B illustrates different example dwell predictions based on the pad removal profile illustrated in FIG. 10A. The dwell profile 1004 is a dwell profile generated based on a sensor (e.g., a displacement sensor 160 of FIG. 3). As illustrated, the dwell prediction 1006 generated based on the pad wear removal model without regularization model tracks more closely to the dwell profile 1004 in radial areas with higher percentage of dwell times, but otherwise does not track well with the dwell profile 1004. However, the dwell prediction 1008 generated based on the pad wear removal model with regularization does appear to track closer to the overall shape of the dwell profile 1004. It is believed that the reason that the dwell prediction 1008 tracks closer to the overall shape of the dwell profile 1004 is due in at least part to the removal of noise from the pad wear model, which thus tends to smooth out the dwell prediction profile 1008.

The pad wear model may be used to generate high resolution pad removal profiles for regular and engineered platens using a Kalman filter, or high resolution pad removal profiles for shaped (e.g., recessed pads) using a dual Kalman filter. A Kalman filter includes an algorithm that uses a series of measurements observed over time, containing statistical noise and other inaccuracies, and produces estimates of unknown variables that tend to be more accurate than those based on a single measurement along, by estimating probabilities of the variables for each time frame. The Kalman filter can be used to predict pad wear by taking advantage of the pad wear model with some inaccuracies and taking in measurements of the pad wear in order to produce a more accuracy pad wear model. While using a single Kalman filter can produce a more accurate model than a profile based solely off of measurements, the pad wear model generated using a single Kalman filter can still include inaccuracies because of the parameters used for the pad wear model. A dual Kalman filter can be used in modelling pad wear by modeling both pad wear and a parameter used in modeling the pad wear (e.g., cut rate). As mentioned previously, cut rate may depend on the pad conditioning disk down force, the type of pad and/or disk used for pad conditioning, and drifts over the lifetime of the pad and/or disk. With a dual Kalman filter, one Kalman filter may be used to model the pad wear and the other Kalman filter may be used to model the cut rate in order to generate a more accurate pad wear model.

Figure 11:
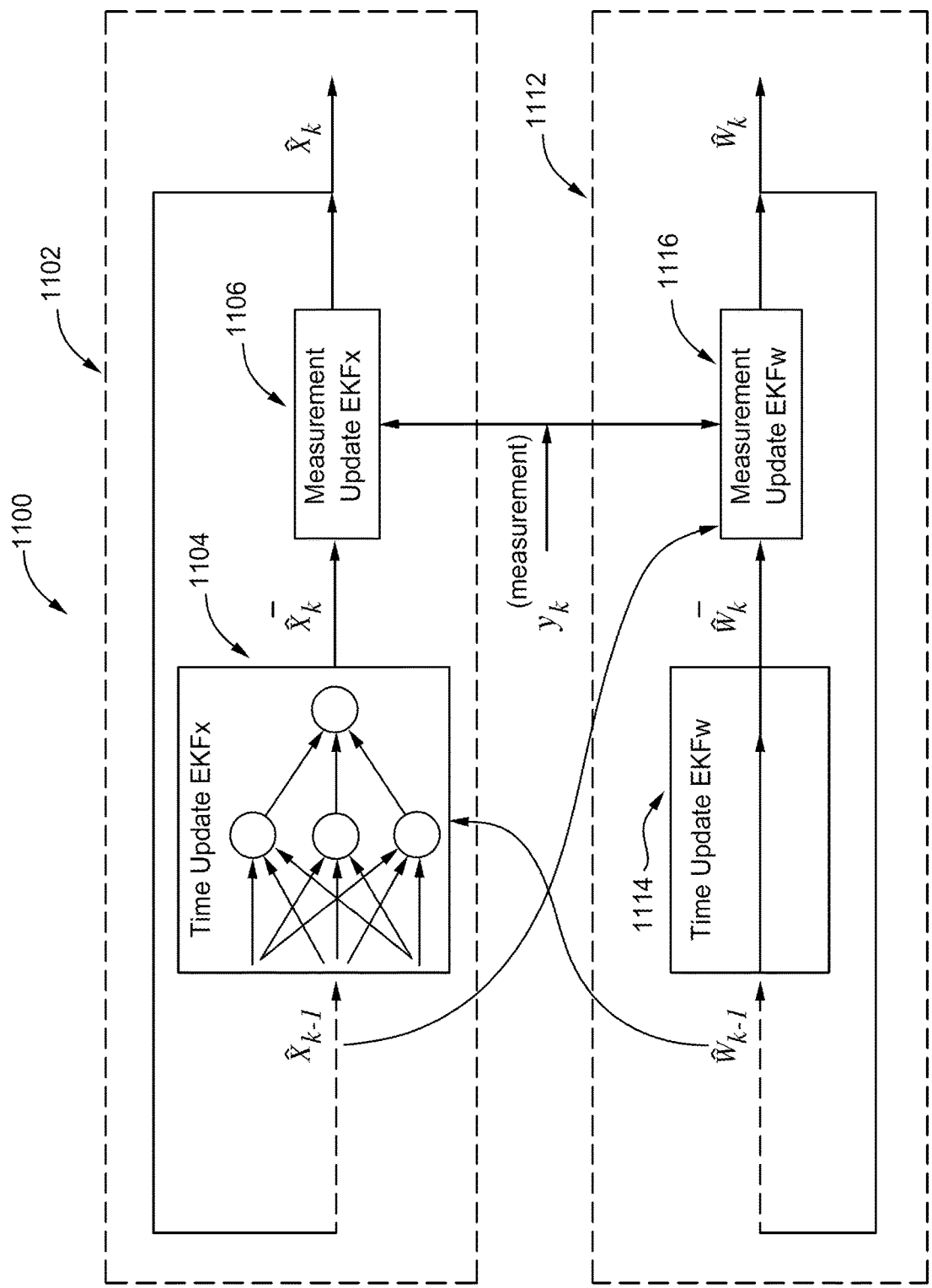
FIG. 11 illustrates an exemplary dual Kalman filter.

FIG. 11 illustrates a dual Kalman filter 1100 to which the pad wear removal model may applied. A dual Kalman filter involves two extended Kalman filters 1102 and 1112: the Kalman filters 1102 generate state estimates $\hat{x}_k$, and requires previous weight estimates $\hat{w}_{k-1}$ for a time update 1104, while the Kalman filter 1112 generates weight estimates $\hat{w}_k$ and requires previous state estimates $\hat{x}_{k-1}$ for the measurement update 1116. As illustrated, the Kalman filter 1102 takes in a previous state estimate $\hat{x}_{k-1}$ and performs a time update 1104 to get a current state estimate $\hat{x}_k$ and performs a measurement update 1106 on the current state estimate $\hat{x}_k$. The Kalman filter 1102 also takes in a previous weight estimate $\hat{w}_{k-1}$ for performing the time update 1104. Meanwhile, the Kalman filter 1112 takes in a previous weight estimate $\hat{w}_{k-1}$ and performs a time update 1114 to get a current weight estimate $\hat{w}_k$ and performs a measurement update 1116 on the current weight estimate. The Kalman filter 1112 also takes in the previous state estimate $\hat{x}_{k-1}$ for performing the measurement update 1116 to the current weight estimate $\hat{w}_k$. For both Kalman filter 1102 and 1112, the measurement updates 1106, 1116 for both Kalman filters 1102 and 1112 requires current measurements $\hat{y}_k$. Once the Kalman filters 1102 and 1112 finish with the measurement updates, the output of the measurement updates 1106, 1116 can be used for the Kalman filters 1102 and 1112 for the next iteration.

According to some embodiments, the pad wear model can be refined using the dual Kalman filter 1100 of FIG. 11. In such embodiments, both Kalman filter 1102 and 1112 receive a previously generated pad wear model and previous cut rates. The previously generated pad wear model and the previous dwell time measurements may be stored in a controller (e.g., controller 190) or in memory coupled to a processor, and the previously generated pad wear model and the previous dwell time measurements may be sent to the controller and/or processor for use with the dual Kalman filter. With the previously generated pad wear model and the previous cut rates, Kalman filter 1102 involves generating a new/current pad wear based on the previously generated pad wear model and the previous cut rates. After generating the new/current pad wear model, the Kalman filter 1102 updates pad wear model with new measurements, and the new measurements are used for future generated pad wear models. The new measurements can come from outside sources, such as sensors, pin gauge measurements, etc.

While the Kalman filter 1102 is generating the new/current pad wear model and updating the new/current pad wear model with new measurements, Kalman filter 1112 is also updating the previous cut rates with the new measurements. In some embodiments, updating the previous cut rates can involve generating dwell time predictions based on previous measurements and other available information. The updated cut rates used with future generated pad wear models by Kalman filter 1102.

Figure 12:
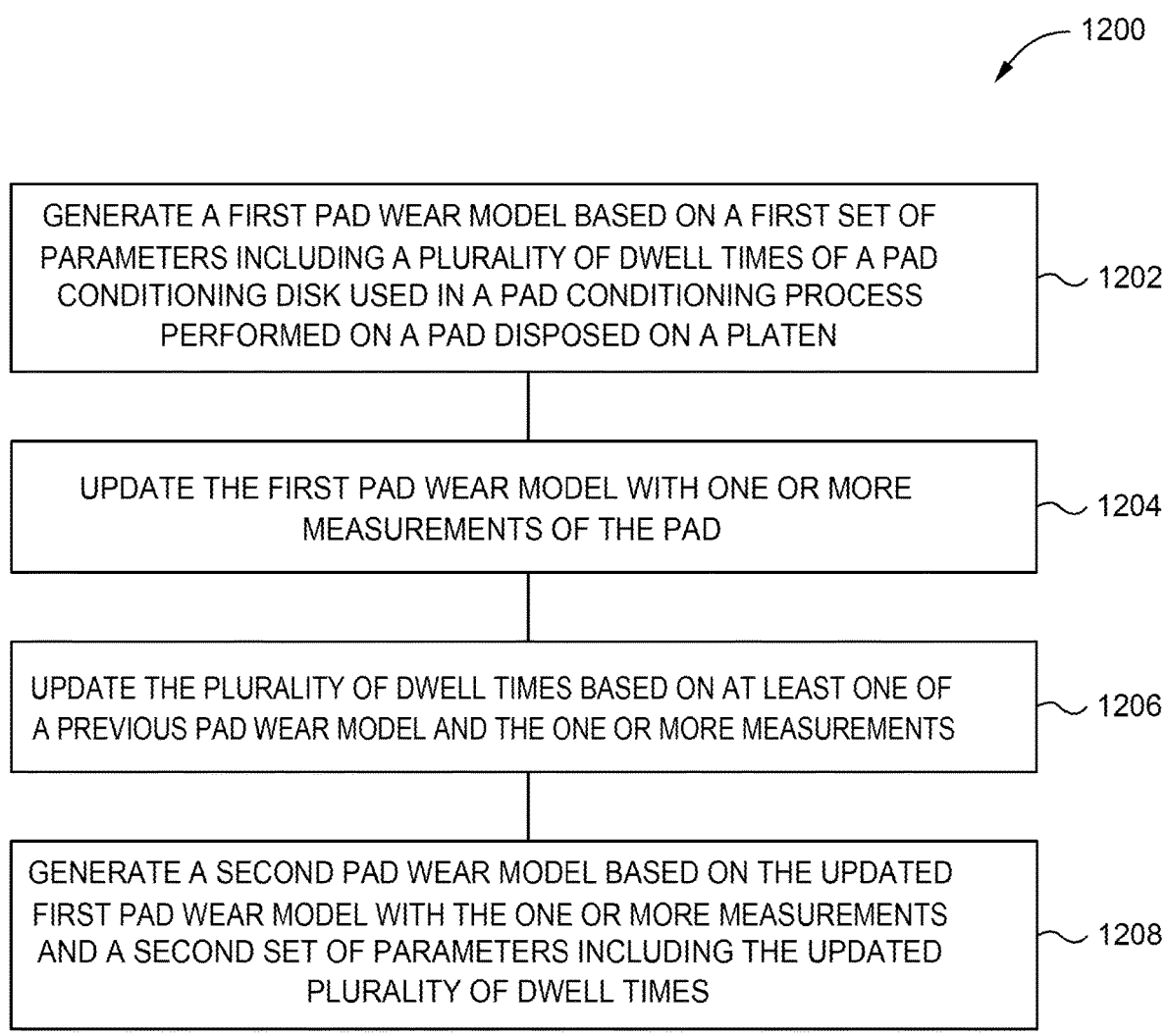
FIG. 12 is a flow diagram illustrating example for polishing a substrate, according to one embodiment.

FIG. 12 is a flow diagram of example operations for a pad conditioning process, according to one embodiment. Specifically, operations 1200 may be implemented as software components that are executed and run on one or more processors within the controller 190. In the embodiment for a pad conditioning process, operations 1200 involve pad wear model generated using dual Kalman filters (e.g., dual Kalman filters 1100 of FIG. 11).

The operations 1200 may begin at block 1202 by generating a first pad wear model based on a first set of parameters, the first set of parameters include a plurality of cut rates of a pad conditioning disk used in a pad conditioning process performed on a pad disposed on a platen.

At block 1204, operations 1200 continue with updating the first pad wear model based on one or more measurements of the pad.

At block 1206, operations 1200 continue with updating the plurality of dwell times based on at least one of a previous pad wear model and the one or more measurements of the pad. The updates to the plurality of cut rates involve using the plurality of cut rates used from a previous pad wear model, and receiving the one or more measurements of the pad that can be used to change the plurality of cut rates. The one or more measurements of the pad may include sensor measurements taken while conditioning the pad or pin gauge measurements taken between pad conditioning sessions. In some embodiments, updating the plurality of dwell times may be determined by generating a model of cut rates.

At block 1208, operations 1200 continue with generating a second pad wear model based on the updated first pad wear model with the one or more measurements and a second set of parameters, the second set of parameters including the updated plurality of dwell times.

In some embodiments, the dual Kalman filter is used to predict the cut rate to be used for generating the pad wear model, and the predicted cut rate can improve the generated pad wear model. The application of the dual Kalman filter provides real time estimates of the pad cut rate and pad wear across the pad even though the sensor measurements used to determine pad wear are noisy (e.g., significant fluctuations). Additionally, the application of the dual Kalman filter provides accurate characterization of pad wear to determine when to change the polishing pad, and the models generated from the dual Kalman filters can be applied to the pad conditioning process for polishing pads having one or more recesses.

Figure 13A:
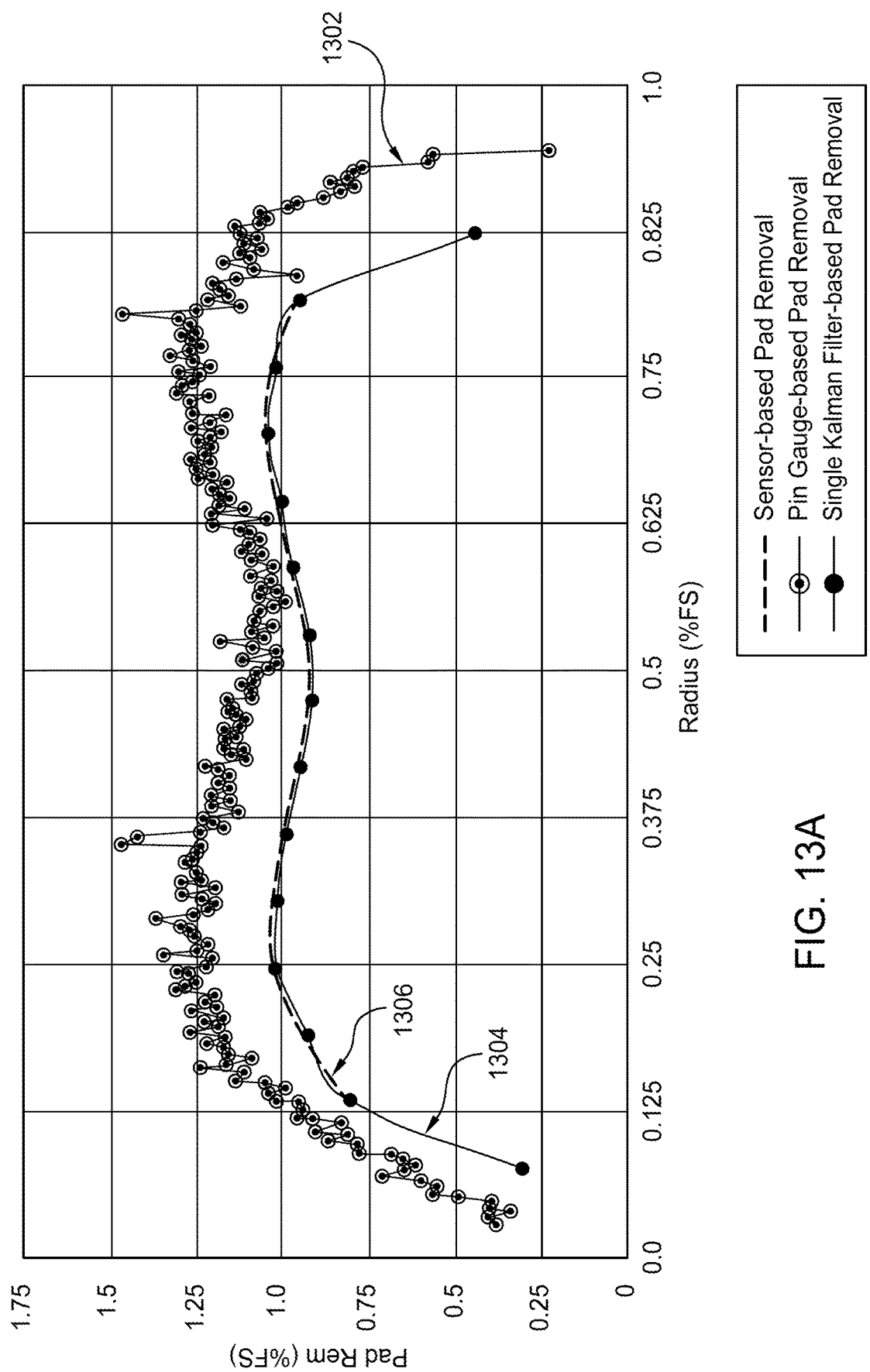
FIGS. 13A and 13B illustrate example pad wear removal profiles, according to one embodiment.
Figure 13B:
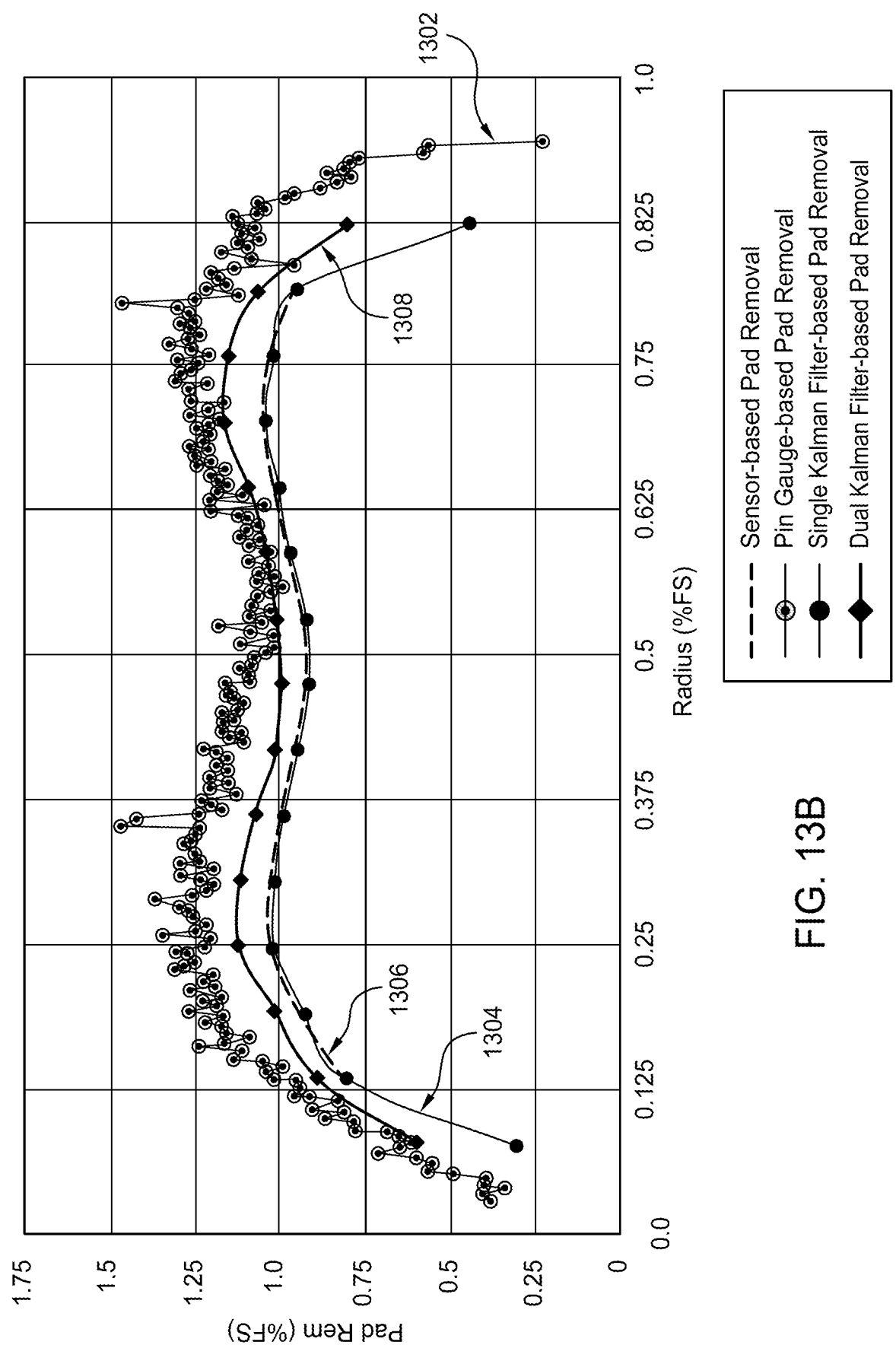

FIGS. 13A and 13B illustrate pad wear removal profiles for pads disposed on engineered platens (e.g., platens with a non-planar surface), according to an embodiment. FIG. 13A illustrates the pad wear profile 1302 based on pin gauge measurements (e.g., by surface profiler 314 of FIG. 3), a pad wear profile 1306 as measured by a sensor (e.g., displacement sensor 160 of FIG. 2), and a pad wear profile 1304 as estimated by pad wear model passing through a single Kalman filter. FIG. 13B illustrates the pad wear profiles 1302, 1304, and 1306, and also illustrates a pad wear profile 1308 estimated by a pad wear model passing through a dual Kalman filter. As illustrated, the pad wear profile 1308 estimated by the pad wear model passing through the dual Kalman filter is disposed closer to the pad wear profile 1302 than pad wear profiles 1304 and 1306, and is thus considered more accurate and more representative of the actual pad wear. By using the dual Kalman filter, the pad wear model is more accurate and more representative of the actual pad wear compared to a pad wear using a single Kalman filter.

Figure 14:
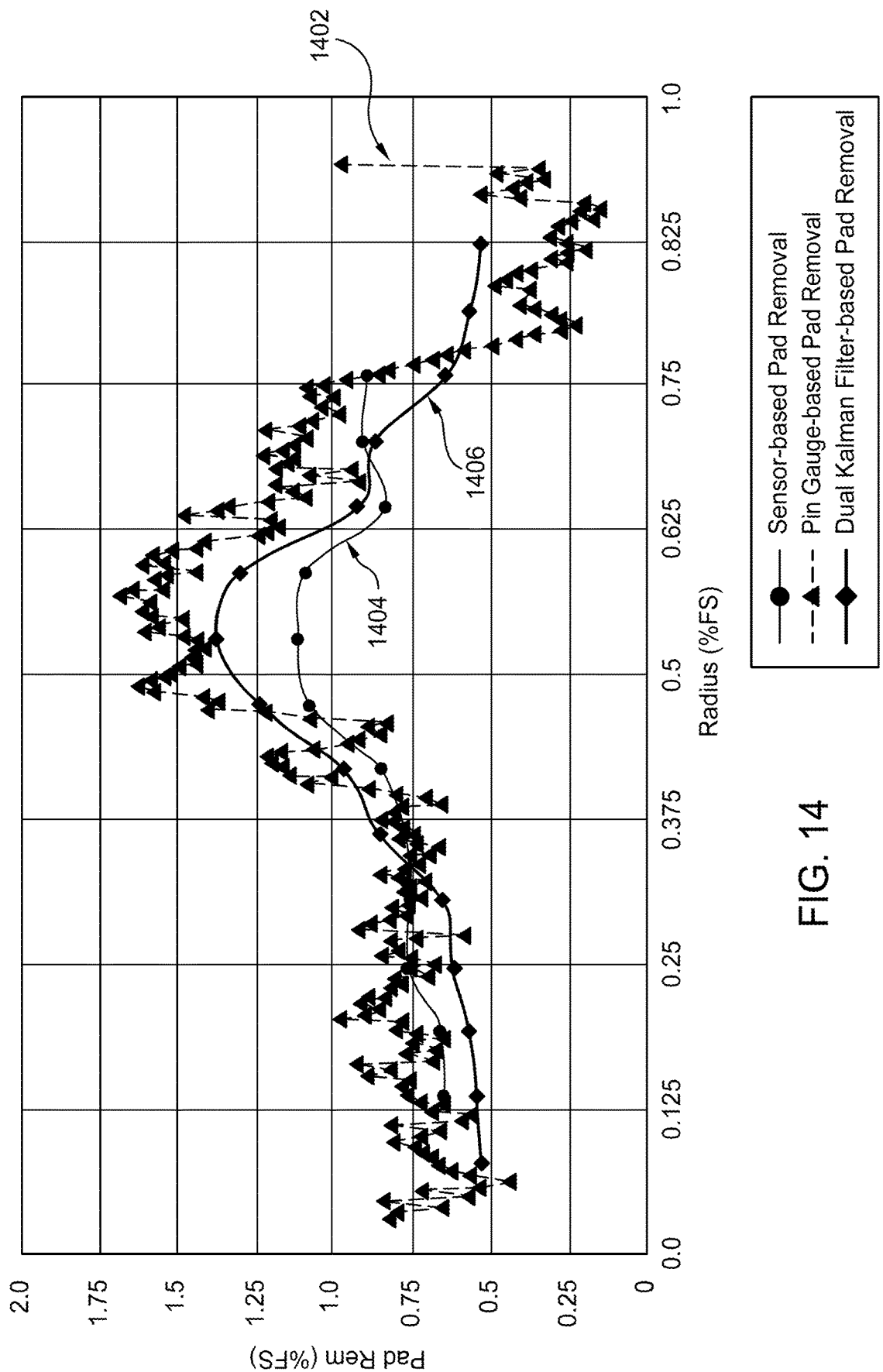
FIG. 14 illustrates example pad wear removal profiles, according to one embodiment.

FIG. 14 illustrates pad wear removal profiles for shaped pads or recessed pads (i.e., pads having recess on the surface used to polish the substrate) on regular platens, according to an embodiment. Specifically, FIG. 14 illustrates the pad wear profile 1402 based on pin gauge measurements (e.g., via surface profiler 314 of FIG. 3), a pad wear profile 1404 as measured by a sensor (e.g., displacement sensor 160 of FIG. 2), and a pad wear profile 1406 as estimated by pad wear model passing through a dual Kalman filter. These pad wear profiles illustrate pad shaping exsitu results using a dual Kalman filter. As illustrated, the pad wear profile 1406 estimated by the pad wear model passing through the dual Kalman filter tracks more closely to the pad wear profile 1402 than pad wear profile 1404.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 12.

What is claimed is:

1. A method of polishing a substrate, comprising:
   receiving, by a controller, a plurality of dwell times of a pad conditioning disk, wherein the plurality of dwell times are to be used in a pad conditioning process performed on a pad disposed on a platen, each dwell time corresponding to a zone of a plurality of zones of the pad disposed on the platen;
   determining, by the controller, a plurality of total pad conditioning disk cut times to be used in the pad conditioning process based on the plurality of dwell times of the pad conditioning disk, each total pad conditioning disk cut time corresponding to a zone of the plurality of zones;
   generating, by the controller, a pad wear removal model based on a set of parameters, including the plurality of dwell times and the plurality of total pad conditioning disk cut times;
   applying, by the controller, a first filter to the pad wear removal model to form a first filtered pad wear removal model, wherein the first filter is configured to filter the pad wear removal model based on receipt of a first set of parameter data;
   simultaneously applying, by the controller, a second filter to the pad wear removal model to form a second filtered pad wear removal model, wherein the second filter is configured to filter the pad wear removal model based on receipt of a second set of parameter data and simultaneously applying the second filter is performed in parallel with applying the first filter to the pad wear removal model;
   updating, by the controller, the pad wear removal model based on the first filtered pad wear removal model and the second filtered pad wear removal model to form an updated pad wear removal model;
   applying, by the controller, the updated pad wear removal model to a pad conditioning recipe to form an updated pad conditioning recipe for conditioning the pad; and
   conditioning the pad using the updated pad conditioning recipe.

2. The method of claim 1, further comprising adjusting at least one of the set of parameters to be used in the pad conditioning process based on the pad wear removal model.

3. The method of claim 2, wherein the set of parameters comprises at least one of a cut rate and conditioning time, down force amount, linear platen velocity, or annular area of the pad conditioning disk.

4. The method of claim 3, further comprising determining the cut rate based on at least one of the down force amount, the linear platen velocity, or the annular area of the pad conditioning disk.

5. The method of claim 3, wherein the cut rate is represented by a matrix comprising a cut rate of the pad conditioning disk for each zone of the plurality of zones.

6. The method of claim 1, wherein the plurality of total pad conditioning disk cut times is represented by a banded matrix, wherein a width of the band for a zone of the plurality of zones corresponds to a size of the pad conditioning disk.

7. The method of claim 6, wherein a diameter of the pad conditioning disk is greater than a radial distance of boundaries of each zone of the plurality of zones.

8. The method of claim 1, further comprising generating a dwell prediction profile based on the pad wear removal model and the set of parameters.

9. The method of claim 8, wherein the dwell prediction profile depends on a noise level of the pad wear removal model.

10. The method of claim 1, further comprising generating a high resolution pad removal profile based on the pad wear removal model using a Kalman filter.

11. The method of claim 1, wherein the first set of parameter data includes estimates previously used by the second filter and the second set of parameter data includes estimates previously used by the first filter.

12. The method of claim 1, wherein applying the first filter includes applying the first filter to a pad wear parameter of the pad wear removal model and applying the second filter includes applying the second filter to a parameter of the pad wear parameter.

13. A pad conditioning process, comprising:
    generating a first pad wear model based on a first set of parameters including a plurality of cut rates of a pad conditioning disk used in the pad conditioning process performed on a pad disposed on a platen, the first pad wear model generated by a controller;
    applying a first filter to the first pad wear model to form a first filtered pad wear removal model, wherein the first filter is configured to filter the first pad wear model based on receipt of the first set of parameters;
    simultaneously applying a second filter to the first pad wear model to form a second filtered pad wear removal model, wherein the second filter is configured to filter the first pad wear model based on receipt of a second set of parameters and simultaneously applying the second filter is performed in parallel with applying the first filter to the first pad wear model;
    updating the first pad wear model based on one or more measurements of the pad, the first filtered pad wear removal model, and the second filtered pad wear removal model;
    updating the plurality of cut rates based on at least one of a previous pad wear model and/or on the one or more measurements;
    generating a second pad wear model based on the updated first pad wear model with the one or more measurements and the second set of parameters including the updated plurality of cut rates;
    applying the second pad wear model to a pad conditioning recipe to form an updated pad conditioning recipe for conditioning the pad; and
    conditioning the pad using the updated pad conditioning recipe.

14. The process of claim 13, further comprising adjusting at least one parameter to be used in the pad conditioning process based on the second pad wear model.

15. The process of claim 13, wherein the first set of parameters comprises at least one of a plurality of dwell times, conditioning time, and/or a plurality of total cut times for a pad.

16. The process of claim 15, wherein the plurality of total cut times is represented by a banded matrix, wherein a width of a band for a zone of a plurality of zones corresponds to a size of the pad conditioning disk.

17. The process of claim 15, wherein the plurality of cut rates are is represented by a matrix comprising a cut rate for each zone of a plurality of zones of the pad.

18. The process of claim 15, further comprising generating the plurality of dwell times based on the first set of parameters.

19. The process of claim 13, wherein the one or more measurements comprise pin gauge measurements.

20. The process of claim 13, wherein the previous pad wear model comprises a third pad wear model generated before generating the first pad wear model.

21. A method of conditioning a surface of a polishing pad, comprising:
  abrading the surface of the polishing pad by translating a pad conditioning disk across the surface of the polishing pad, wherein abrading further comprises:
    determining a plurality of dwell times, wherein each dwell time includes the time that the pad conditioning disk dwells over each of a plurality of radial conditioning zones while translating the pad conditioning disk, wherein the plurality of radial conditioning zones are concentric to a central axis of the polishing pad,
    wherein the determining comprises combining a cut rate for each of the plurality of radial conditioning zones and a desired material removal amount for each of the plurality of radial conditioning zones; and
    dwelling over one or more of the plurality of radial conditioning zones of the polishing pad while translating across the surface of the polishing pad; and
  determining when to replace the polishing pad by modeling progression of pad wear using the plurality of dwell times, wherein the modeling progression of pad wear comprises:
    generating, by a controller, a pad wear removal model based on a set of parameters, including the plurality of dwell times and a plurality of total pad conditioning disk cut times;
    applying a first filter to the pad wear removal model to form a first filtered pad wear removal model, wherein the first filter is configured to filter the pad wear removal model based on receipt of a first set of parameter data;
    simultaneously applying a second filter to the pad wear removal model to form a second filtered pad wear removal model, wherein the second filter is configured to filter the pad wear removal model based on receipt of a second set of parameter data and simultaneously applying the second filter is performed in parallel with applying the first filter to the pad wear removal model;
    updating the pad wear removal model based on the first filtered pad wear removal model and the second filtered pad wear removal model to form an updated pad wear removal model;
    applying the updated pad wear removal model to a pad conditioning recipe to form an updated pad conditioning recipe for conditioning the polishing pad; and
  conditioning the polishing pad using the updated pad conditioning recipe.

22. The method of claim 21, wherein the radial conditioning zones comprises two radial conditioning zones.

* * * * *